(12) United States Patent
Sullender

(10) Patent No.: US 8,249,348 B2
(45) Date of Patent: Aug. 21, 2012

(54) LABEL REUSE METHOD AND SYSTEM FOR CONNECTED COMPONENT LABELING

(75) Inventor: Craig Sullender, Austin, TX (US)

(73) Assignee: Eyep Inc., Austin, TX (US)

( * ) Notice: Subject to any disclaimer, the term of this patent is extended or adjusted under 35 U.S.C. 154(b) by 1231 days.

(21) Appl. No.: 12/028,146

(22) Filed: Feb. 8, 2008

(65) Prior Publication Data
US 2009/0196503 A1 Aug. 6, 2009

Related U.S. Application Data

(63) Continuation-in-part of application No. 12/025,738, filed on Feb. 4, 2008.

(51) Int. Cl.
*G06K 9/34* (2006.01)
(52) U.S. Cl. .................................................. 382/180
(58) Field of Classification Search .......... 382/100–107, 382/173, 180; 348/169–176; 345/582–588
See application file for complete search history.

(56) References Cited

U.S. PATENT DOCUMENTS

| | | |
|---|---|---|
| 4,791,676 A | 12/1988 | Flickner et al. |
| 7,298,899 B2 | 11/2007 | Koide et al. |
| 2006/0104513 A1 | 5/2006 | Aharon et al. |

FOREIGN PATENT DOCUMENTS

| | | |
|---|---|---|
| WO | WO2006083236(A1) | 8/2006 |
| WO | WO2006109250(A2) | 10/2006 |

OTHER PUBLICATIONS

Dinstein, I. et al., "Handling Memory Overflow in Connected Component Labeling Application", IIEE Transactions on Pattern Analysis and Machine Intelligence. Jan. 1985, vol. PAMI-7, No. 1, pp. 116-121.
Wan, Shu-Yen, et. at., "Symmetric Region Growing", IIEE Transactions on Image Processing, vol. 12, No. 9, Sep. 2003.
Buvry, et al., "A Rule-Based System for Region Segmentation Improvement in Stereovision", ENSEEIHT-IRIT-UA 1399 CNRS, 11 pages, 1994.
Chang, et al., "A Linear-Time Component-Labeling Algorithm Using Contour Tracing Technique", Institute of Information Science, Academia Sinica, Taiwan, pp. 1-20, 2004.
Dillencourt, et al., "A General Approach to Connected-Component Labeling for Arbitrary Image Representations", Journal of the Association for Computing Machinery, vol. 39, No. 2, Apr. 1992, pp. 253-280.

(Continued)

*Primary Examiner* — Atiba O Fitzpatrick
(74) *Attorney, Agent, or Firm* — Michael Ervin; M. A. Ervin & Associates

(57) ABSTRACT

Embodiments disclosed include methods and systems for reusing labels for connected component labeling including assigning one or more labels to one or more groups of raw data representing one or more regions by designating one or more data structures as containing information about the one or more regions; connecting the one or more labels determined to be related; choosing a root label for the connected one or more labels, the root label determined by locating an earliest data element from the one or more groups of raw data; altering a label list of the one or more labels, the label list altered by flagging the root label to include a region label index; and overwriting one or more region label indexes according to the root label.

1 Claim, 26 Drawing Sheets

OTHER PUBLICATIONS

Felzenszwalb, et al., "Efficiently Computing a Good Segmentation", Computer Science Department, Cornell University, pp. 1-31, 1998.

Greinder, "A Comparison of Parallel Algorithms for Connected Components", Carnegie Mellon University, 10 pages, 1994.

He, et al., "A Run-Based Two-Scan Labeling Algorithm", ICIAR 2007, LNCS 4633, pp. 131-142, 2007.

Hoover, et al., "An Experimental Comparison of Range Image Segmentation Algorithms", IEEE Transactions on Pattern Analysis and Machine Intelligence, vol. 18, No. 7, Jul. 1996, pp. 673-689.

Mirmehdi, "Segmentation of Color Textures", IEEE Transactions on Pattern Analysis and Machine Intelligence, vol. 22, No. 2, Feb. 2000, pp. 142-159.

Rasquinha, et al., "C3L: A Chip for Connected Component Labeling", 10th International Conference on VLSI Design—Jan. 1997, pp. 446-450.

Shima, et al., "A High Speed Algorithm for Propagation-type Labeling based on Block Sorting on Runs in Binary Images", IEEE 1990, pp. 655-658.

Skarbek, et al., "Colour Image Segmentation—A Survey-", Technisher Bericht 94-32, Technische Universitat Berlin, Germany, Oct. 1994, 81 pages.

Tsin, et al., "Bayesian Color Constancy for Outdoor Object Recognition", Proceedings of the IEEE 2001 Conference on Computer Vision and Pattern Recogniton, pp. 1-8.

FIGURE 7 ("prior art")

choosing a label for a region containing the "earliest data" as a root when connecting related data elements 810 flagging or otherwise marking the root label 820

L[75] = 91 (was r7)     R[7] = < abandoned >
L[91] = r23              R[23] = << R23 + R7 info >

Label Buffer      Label List      Region List
    910              920              930

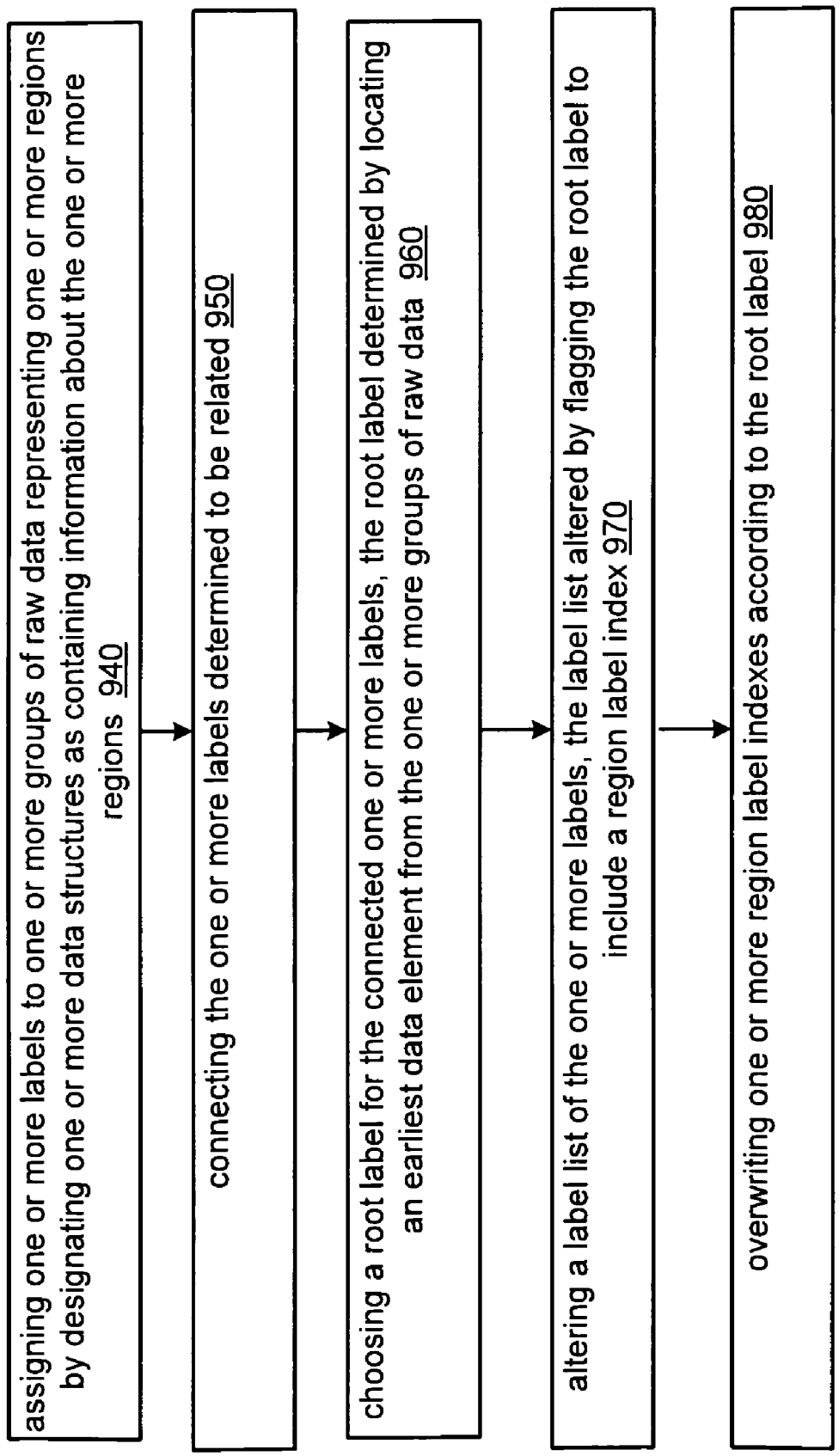

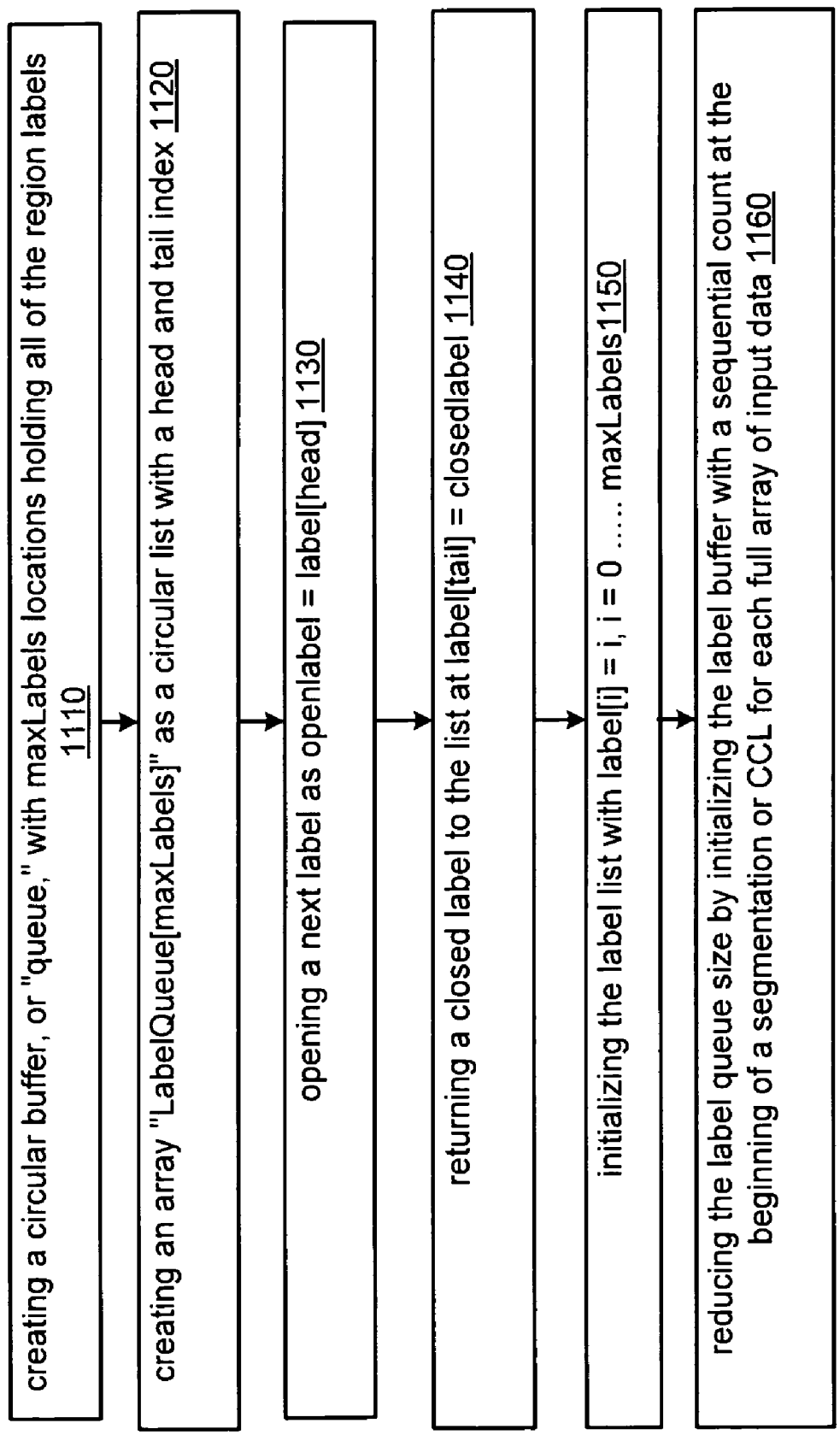

relabeling segmented data 1310 representing data that is known to be connected because of some discernable quality or because it has been labeled and the roots are known by overlapping line segments 1320 operating on line segments from two lines 1330

Previous line 1420
Current line 1410

1400

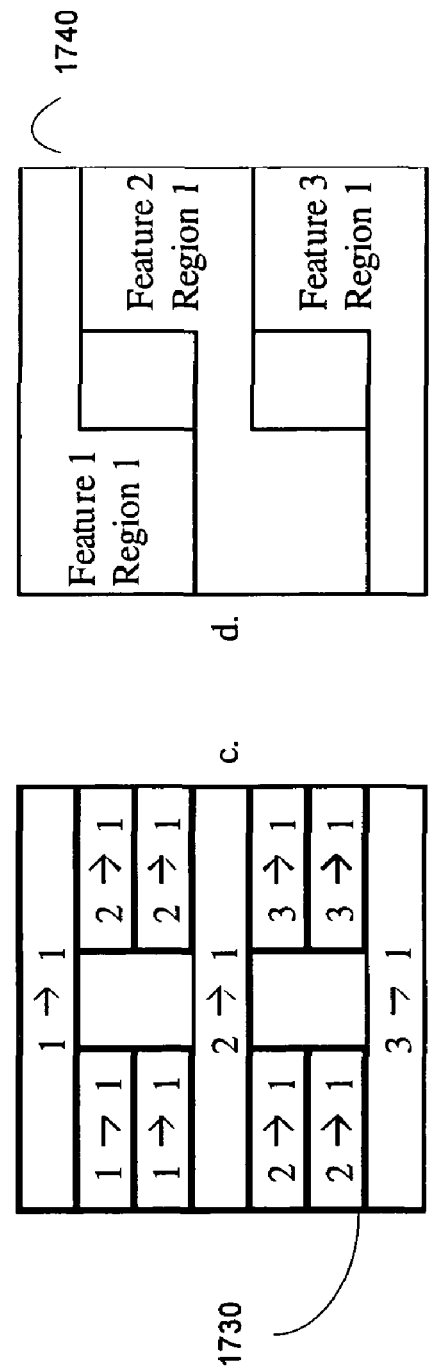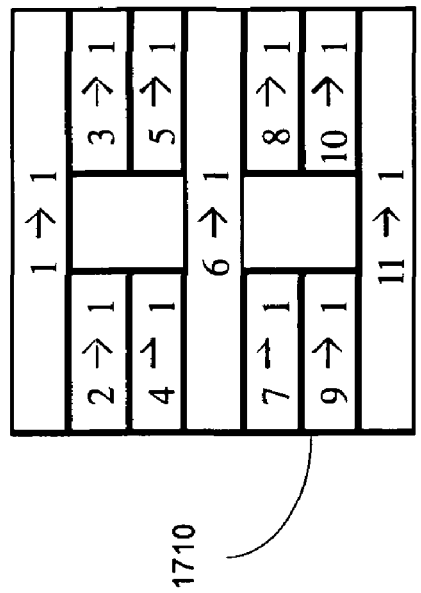
FIGURE 17A (prior art)
FIGURE 17B

Label: <feature or region label>   Property: <color> <circle>   Boundary: <extent> or <center point, radius>,
2110                               2120                          2130

LABEL REUSE METHOD AND SYSTEM FOR CONNECTED COMPONENT LABELING

CROSS-REFERENCE TO RELATED APPLICATIONS

The present application is related to and claims the benefit of the earliest available effective filing date(s) from the following listed application(s) (the "Related Applications") (e.g., claims earliest available priority dates for other than provisional patent applications or claims benefits under 35 USC §119(e) for provisional patent applications, for any and all parent, grandparent, great-grandparent, etc. applications of the Related Application(s)).

Related Applications

For purposes of the USPTO extra-statutory requirements, the present application constitutes a continuation-in-part of U.S. patent application Ser. No. 12/025,738, entitled CONNECTED COMPONENT LABELING SYSTEM AND METHOD, naming Craig Sullender as inventor, filed 4, Feb. 2007, which is currently co-pending, or is an application of which a currently co-pending application is entitled to the benefit of the filing date.

The United States Patent Office (USPTO) has published a notice to the effect that the USPTO's computer programs require that patent applicants reference both a serial number and indicate whether an application is a continuation or continuation-in-part. Stephen G. Kunin, Benefit of Prior-Filed Application, USPTO Official Gazette Mar. 18, 2003, available at http://www.uspto.gov/web/offices/com/sol/og/2003/week11/patbene.htm. The present Applicant Entity (hereinafter "Applicant") has provided above a specific reference to the application(s) from which priority is being claimed as recited by statute. Applicant understands that the statute is unambiguous in its specific reference language and does not require either a serial number or any characterization, such as "continuation" or "continuation-in-part," for claiming priority to U.S. patent applications. Notwithstanding the foregoing, Applicant understands that the USPTO's computer programs have certain data entry requirements, and hence Applicant is designating the present application as a continuation-in-part of its parent applications as set forth above, but expressly points out that such designations are not to be construed in any way as any type of commentary and/or admission as to whether or not the present application contains any new matter in addition to the matter of its parent application(s).

All subject matter of the Related Applications and of any and all parent, grandparent, great-grandparent, etc. applications of the Related Applications is incorporated herein by reference to the extent such subject matter is not inconsistent herewith.

TECHNICAL FIELD

The present application relates generally to the field of connected component labeling.

BACKGROUND

In general, connecting related data and maintaining an accounting of related data connections is referred to as "connected component labeling" herein referred to as "CCL". CCL is typically used for image analysis for computer vision. For example, an algorithm can be applied to an image, such as a binary image to separate object pixels from background pixels. Another use of CCL is to provide numeric labels for components identified in an image, such as a two-dimensional (2D) array. CCL is also used during the segmentation of other types of 1D, 2D, and 3D data such as financial data and digital audio. CCL and segmentation extract the needed information from data and images so that digital communications such as computer networks are not clogged with unnecessary high-bandwidth data.

Known methods to determine CCL include scanning an image to assign a provisional label and later determine a final label for each pixel. Scanning can assign such labels by locating neighbors and determining an appropriate label. Known methods include applying multi-pass labeling, two-pass labeling, depending on the complexity required for an application.

A problem with CCL methods is that memory requirements for many applications do not permit the required use of space for known CCL techniques. For example, the multi-pass labeling method requires repeated scanning and saving data in memory prior to determining a final label value for a single pixel in an image. What is needed is a CCL system and method that does not require the memory space of earlier known techniques and demands less bandwidth on networks.

SUMMARY

Embodiments disclosed include methods for reusing labels in connected component labeling including assigning one or more labels to one or more groups of raw data representing one or more regions by designating one or more data structures as containing information about the one or more regions; connecting the one or more labels determined to be related; choosing a root label for the connected one or more labels, the root label determined by locating an earliest data element from the one or more groups of raw data; altering a label list of the one or more labels, the label list altered by flagging the root label to include a region label index; and overwriting one or more region label indexes according to the root label. The choosing a root label for the connected one or more labels can include determining the earliest data element according to a lowest result for $((y*w)+x)$ wherein y represents a row value, x represents a column value, and w represents a width value. The choosing can also include flagging the root label by setting an unused memory bit when a prior root label no longer points to itself. In addition to the foregoing, other method aspects are described in the claims, drawings, and text forming a part of the present application.

Another embodiment is directed to a method for reusing one or more labels in a connected component labeling system, including determining a location value for each of the one or more labels, each location value identifying a maximum "y" extent ("yMax") of an associated label region; determining which of the one or more labels refer to areas subsumed in a determination of the yMax location value; and reusing the one or more labels and/or region information memory location values subsumed in the determination of the yMax location value.

In another aspect, a computer program product related to a control technique for object production rights includes but is not limited to a signal bearing medium bearing at least one of one or more instructions for determining a location value for each of the one or more labels, each location value identifying a maximum "y" extent ("yMax") of an associated label region; one or more instructions for determining which of the one or more labels refer to areas subsumed in a determination of the yMax location value; and one or more instructions for reusing the one or more labels and/or region information memory location values subsumed in the determination of the yMax location value. In addition to the foregoing, other computer program product aspects are described in the claims, drawings, and text forming a part of the present application.

In one or more various aspects, related systems include but are not limited to circuitry and/or programming for effecting the herein-referenced method aspects; the circuitry and/or programming can be virtually any combination of hardware, software, and/or firmware configured to effect the herein-referenced method aspects depending upon the design choices of the system designer.

In one aspect, a connected components labeling system includes a processor; a memory coupled to the processor, the memory configured to include: a circular buffer configured to contain a plurality of locations for holding one or more region labels for the connected components labeling system; a label buffer coupled to the circular buffer, the label buffer configured to be initialized with a sequential count at the beginning of an operation for each array of input data in a raster order, the label buffer configured to hold current labels in use during an operation, the label buffer independent from the height of a connected region; and a label list coupled to the label buffer and the circular buffer, the label list configured to receive closed labels no longer required by the label buffer, the label list initialized with a maximum number of label position to prevent a last label from overtaking a lead label and return label availability to the circular buffer in ascending order.

The foregoing is a summary and thus contains, by necessity, simplifications, generalizations and omissions of detail; consequently, those skilled in the art will appreciate that the summary is illustrative only and is NOT intended to be in any way limiting. Other aspects, features, and advantages of the devices and/or processes and/or other subject described herein will become apparent in the text set forth herein.

BRIEF DESCRIPTION OF THE DRAWINGS

A better understanding of the subject matter of the present application can be obtained when the following detailed description of the disclosed embodiments is considered in conjunction with the following drawings, in which:

FIGS. 9B and 9C are flow diagrams illustrating a method in accordance with an embodiment of the present invention.

FIG. 11 is a flow diagram in accordance with an embodiment of the present invention.

FIG. 17A labeled "prior art" is a prior art diagram of a connected component labeling scheme illustrating how data can be combined to a single region.

FIG. 17B is a diagram illustrating connected component labeling that identifies features in accordance with an embodiment of the present invention.

DETAILED DESCRIPTION OF THE DRAWINGS

Those with skill in the computing arts will recognize that the disclosed embodiments have relevance to a wide variety of applications and architectures in addition to those described below. In addition, the functionality of the subject matter of the present application can be implemented in software, hardware, or a combination of software and hardware. The hardware portion can be implemented using specialized logic; the software portion can be stored in a memory or recording medium and executed by a suitable instruction execution system such as a microprocessor.

Figure 1:
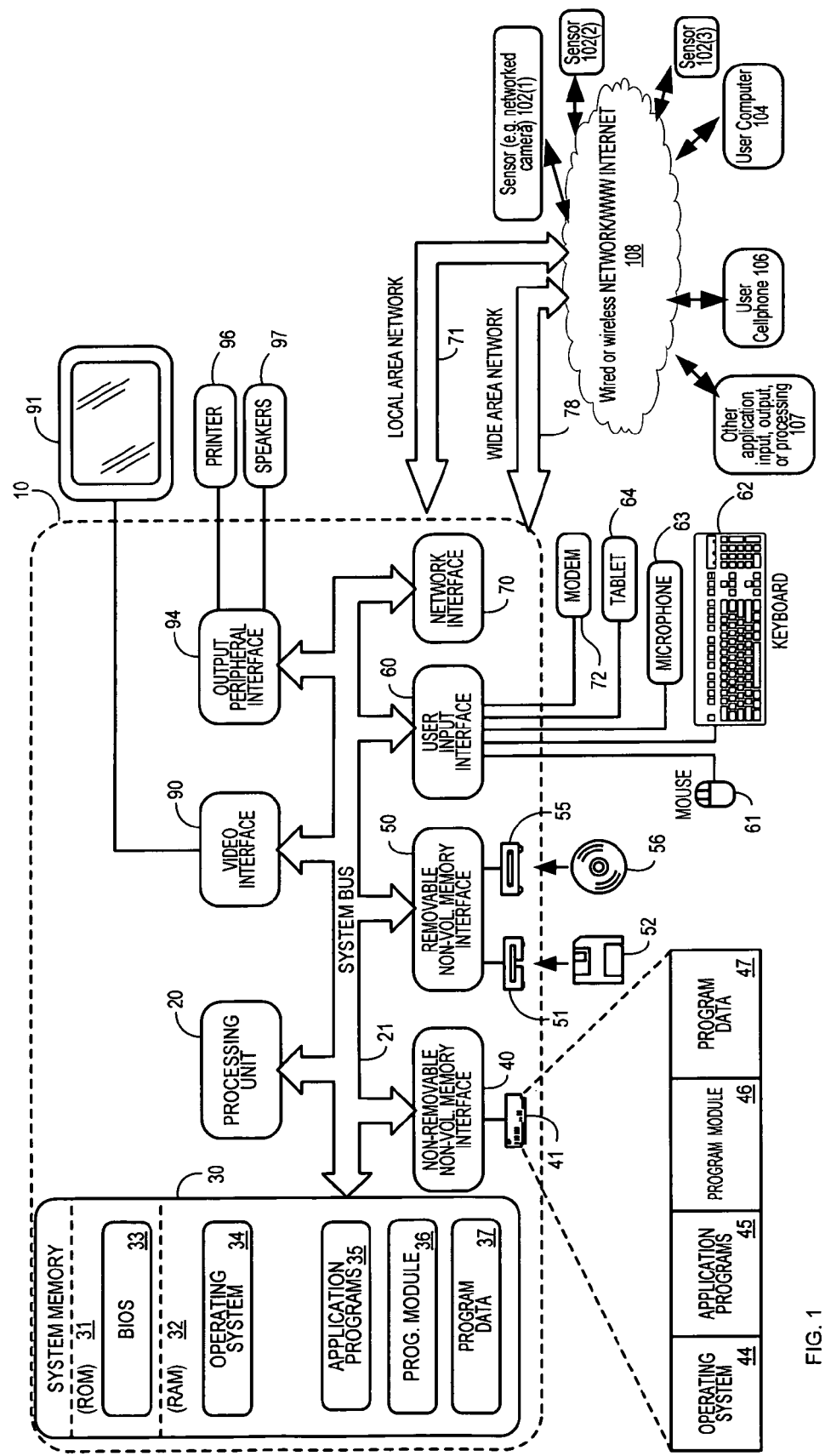
FIG. 1 is a block diagram of an exemplary computer architecture that supports the claimed subject matter.

With reference to FIG. 1, an exemplary computing system for implementing the embodiments and includes a general purpose computing device in the form of a computer 10. Components of the computer 10 may include, but are not limited to, a processing unit 20, a system memory 30, and a system bus 21 that couples various system components including the system memory to the processing unit 20. The system bus 21 may be any of several types of bus structures including a memory bus or memory controller, a peripheral bus, and a local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus also known as Mezzanine bus.

The computer 10 typically includes a variety of computer readable media. Computer readable media can be any available media that can be accessed by the computer 10 and includes both volatile and nonvolatile media, and removable and non-removable media. By way of example, and not limitation, computer readable media may comprise computer storage media and communication media. Computer storage media includes volatile and nonvolatile, removable and non-removable media implemented in any method or technology for storage of information such as computer readable instructions, data structures, program modules or other data. Computer storage media includes, but is not limited to, RAM, ROM, EEPROM, flash memory or other memory technology, CD-ROM, digital versatile disks (DVD) or other optical disk storage, magnetic cassettes, magnetic tape, magnetic disk storage or other magnetic storage devices, or any other medium which can be used to store the desired information and which can be accessed by the computer 10. Communication media typically embodies computer readable instructions, data structures, program modules or other data in a modulated data signal such as a carrier wave or other transport mechanism and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media. Combinations of the any of the above should also be included within the scope of computer readable media.

The system memory 30 includes computer storage media in the form of volatile and/or nonvolatile memory such as read only memory (ROM) 31 and random access memory (RAM) 32. A basic input/output system 33 (BIOS), containing the basic routines that help to transfer information between elements within computer 10, such as during start-up, is typically stored in ROM 31. RAM 32 typically contains data and/or program modules that are immediately accessible to and/or presently being operated on by processing unit 20. RAM 32 is shown with operating system 34, application programs 35, program module 36, and program data 37. By way of example, and not limitation, FIG. 1 illustrates non-removable non-volatile memory interface 40 connected to hard disk drive 41 configured to hold operating system 44, application programs 45, and program module 46 and program data 47 in accordance with an embodiment as described herein.

The computer 10 may also include other removable/non-removable, volatile/nonvolatile computer storage media. By way of example only, FIG. 1 illustrates a magnetic disk drive 51 that reads from or writes to a removable, nonvolatile magnetic disk 52, and an optical disk drive 55 that reads from or writes to a removable, nonvolatile optical disk 56 such as a CD ROM or other optical media. Other removable/non-removable, volatile/nonvolatile computer storage media that can be used in the exemplary operating environment include, but are not limited to, magnetic tape cassettes, flash memory cards, digital versatile disks, digital video tape, solid state RAM, solid state ROM, and the like. The hard disk drive 41 is typically connected to the system bus 21 through a non-removable memory interface such as interface 40, and magnetic disk drive 51 and optical disk drive 55 are typically connected to the system bus 21 by a removable memory interface, such as interface 50. An interface for purposes of this disclosure can mean a location on a device for inserting a drive such as hard disk drive 41 in a secured fashion, or a in a more unsecured fashion, such as interface 50. In either case, an interface includes a location for electronically attaching additional parts to the computer 10.

The drives and their associated computer storage media, discussed above and illustrated in FIG. 1, provide storage of computer readable instructions, data structures, program modules and other data for the computer 10. In FIG. 1, for example, hard disk drive 30 is illustrated as including program module 36 and program data 37. Program module 46 could be in non-volatile memory in some embodiments wherein such a program module that runs automatically in an environment. In other embodiments, program modules could part of an embedded system.

A user may enter commands and information into the computer 10 through input devices such as a microphone 63, a keyboard 62 and pointing device 61, commonly referred to as a mouse, trackball or touch pad. Other input devices (not shown) may include a joystick, game pad, satellite dish, scanner, or the like. These and other input devices are often connected to the processing unit 20 through a user input interface 60 that is coupled to the system bus, but may be connected by other interface and bus structures, such as a parallel port, game port or a universal serial bus (USB). A monitor 91 or other type of display device is also connected to the system bus 21 via an interface, such as an output peripheral interface 94. The monitor 91 may also be integrated with a touch-screen panel or the like. Note that the monitor and/or touch screen panel can be physically coupled to a housing in which the computing device 10 is incorporated, such as in a tablet-type personal computer. In addition, computers such as the computing device 10 may also include other peripheral output devices such as speakers 97 and printer 96, which may be connected through an output peripheral interface 94 or the like.

The computer 10 may operate in a networked environment 108 using logical connections to one or more remote computers, which could be other cell phones with a processor or other computers. As shown, network 108 is a wired or wireless network or internet, connecting sensors 102(1-3), a user computer 104, a user cell phone 106 or other mobile device, and/or an application input, output or other or further processing 107. The user computer 104 may be a personal computer, a server, a router, a network PC, PDA, cell phone computer, a peer device or other common network node, and typically includes many or all of the elements described above relative to the computer 10, although only a memory storage device 81 has been illustrated in FIG. 1. The logical connections depicted in FIG. 1 include a local area network (LAN) 71 which can be a wide area network (WAN) 78, but may also include other networks. Such networking environments are commonplace in offices, enterprise-wide computer networks, intranets and the Internet. For example, in the subject matter of the present application, the computer system 10 may comprise the source machine from which data is being migrated, and the remote computer may comprise the destination machine. Note however that source and destination machines need not be connected by a network or any other means, but instead, data may be migrated via any media capable of being written by the source platform and read by the destination platform or platforms.

Computer 10 can be connected to hardware configured in accordance with embodiments disclosed herein to accomplish connected component labeling. Computer 10 can be output device to collect data or can be included in the processing required for implementing disclosures herein. Thus, computer 10 can be agnostic to one or more disclosures and/or be incorporated as a necessary part of an embodiment as will be appreciated by one of skill in the art.

Connected Component Labeling for Segmentation

Embodiments herein relate to computer and/or processor directed actions for connected components labeling (CCL) Connected Component Labeling (CCL) for designating or labeling of groups or regions of related data. CCL commonly provides the labeling function for segmentation.

Figure 2A:
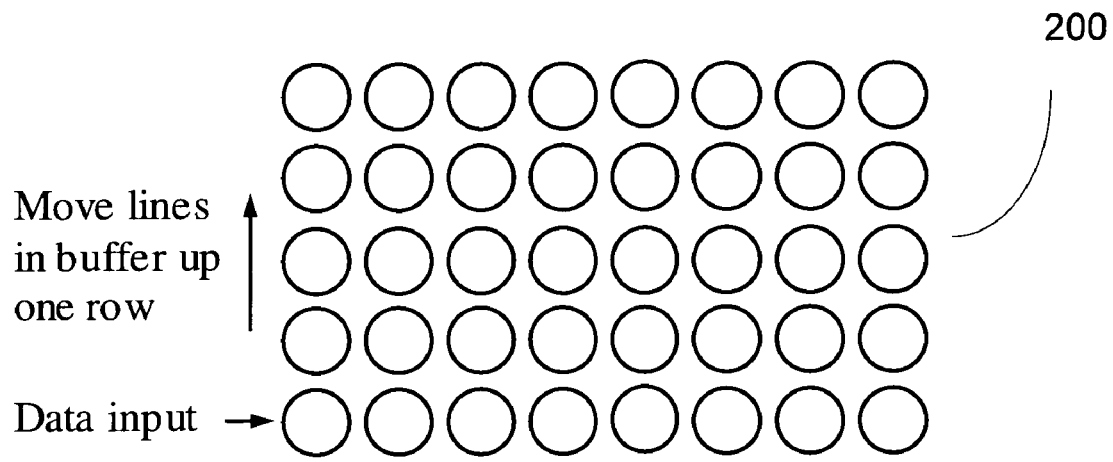
FIGS. 2A and 2B, both labeled "prior art" illustrate a label buffer and a prior art label buffer process, respectively.

In general, the data being considered can include data arranged in "raster" order, typically rows of width w stacked from top to bottom with a height of h rows. For example a specific element of image data is referenced by location, the pixel value at x width and y height is p(x, y). Referring to FIG. 2A, a raster ordered buffer example is illustrated 200 which illustrates how data input is input and how lines in the buffer move up.

Segmentation applies relationship rules to arrays of data. The input to the segmentation function is individual data values. The output of segmentation is the result of iteratively applying the relationship rules to pairs of adjacent data values or groups until the whole array is processed. For example, if the rule is "segment pixels of the same color," then the segmentation function will indicate any groups or regions of matching pixels. Likewise, embodiments can be directed to segmentation based on shape or other characteristics.

Prior art techniques for connected component labeling begin with data locations that are "Labeled" or marked with unique designations. A label buffer can match the data buffer in size, so that each data location has a corresponding label location.

Figure 2B:
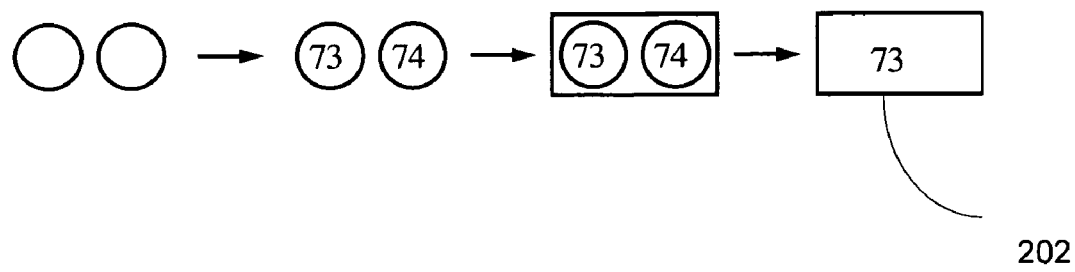

Prior art labeling provides that labels are associated in a linked list (label list) so that linked labels indicate related data. All of the different labels for different areas of a region point to one label, the "root" or "region" label. A common convention is to choose the lowest valued label. For example the related data elements labeled 73 and 74 will be entered into the label list as 74–>73, and 73–>73, or 74 points to 73 and 73 points to itself. The region label is therefore 73. FIG. 2B "prior art" illustrates how labels are combined to provide label 73 202 A function called "Union-Find" containing the function "Find-Root" is commonly used to perform the root search and connection of label pairs. The data values for locations 73 and 74 are combined so that the label 73 represents the collection of data at locations corresponding to labels 73 and 74.

A prior art example CCL method allows region labels to be the unique designators for data structures in memory that hold region information useful to segmentation. For example, for segmenting pixels by color, the region information structure addressed by a region label would contain the average color of that region. After segmentation, important region information has been collected, and the data can be handled as regions (#73, #68) instead of individual data elements.

In summary, CCL and segmentation are interrelated functions. CCL labels and groups data locations selected by segmentation rules. Segmentation analyzes individual data values and the collected region qualities from CCL.

The disadvantages of prior art CCL technique are numerous. For example, if the amount of data is n elements, n locations in memory for labels and region information must be allocated. Also, for prior art methods, a whole array of data must be labeled and then connected, requiring multiple passes and several operations for each data element. In prior art techniques, region growth is unpredictable, making collection of details about region shape expensive and difficult because another complicated and costly pass over the whole data set is required. As a result of prior art methods of performing CCL, the results obtained are presented ad hoc. In other words, there is no standard format for encoding and communicating region features.

Figure 2C:
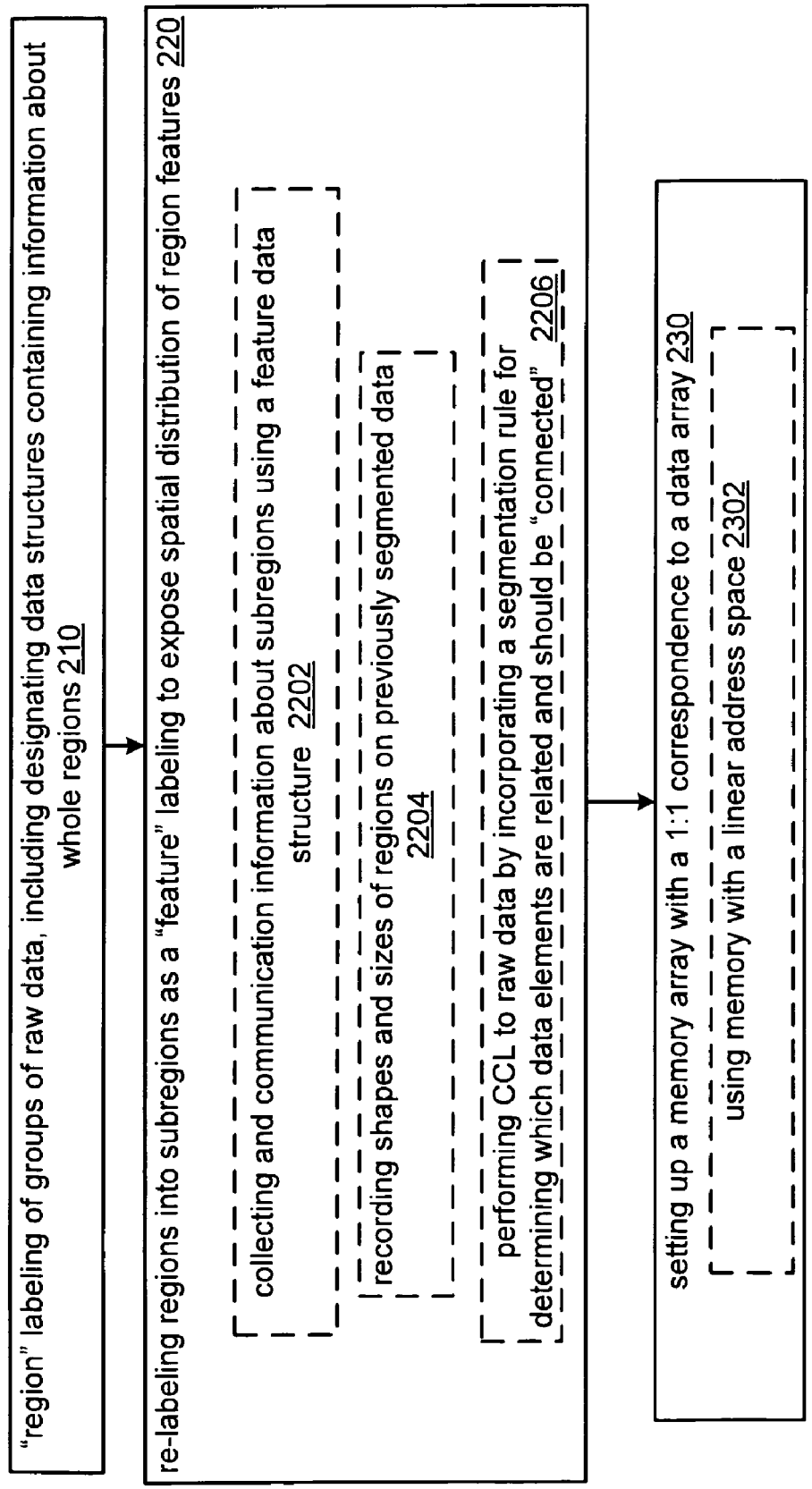
FIG. 2C is a flow diagram in accordance with an embodiment of the present invention.

Referring now to FIG. 2C, a flow diagram illustrates a method according to an embodiment. As shown, block 210 provides for "region" labeling of groups of raw data, including designating data structures containing information about whole regions. Block 220 provides for re-labeling regions into subregions as a "feature" labeling to expose spatial distribution of region features.

Block 220 includes optional block 2202 which provides for collecting and communication information about subregions using a feature data structure. More particularly, feature labels can designate the feature data structures, such as a feature data structure for containing information about subregions. The feature data structure can provide for collecting and communicating feature information. As a result, features can be acquired with controllable precision that uses an architecture that minimizes the memory required for pre-CCL actions, such as segmentation. By designating feature labels, memory required for acquiring region features is optimized.

In one embodiment, as illustrated in optional block 2204, the method provides for recording shapes and sizes of regions on previously segmented data. In another embodiment, the method provides in optional block 2206 for performing CCL to raw data by incorporating a segmentation rule for determining which data elements are related and should be "connected." Thus, CCL can operate on labels applied during segmentation or CCL can be configured to re-label data without regard for previous processing.

In general the data being considered is arranged in "raster" order, typically rows (lines) of width w stacked from top to bottom with a height of h rows. For example a specific element of image data is referenced by location, the pixel value at x width and y height is p(x, y).

Figure 3:
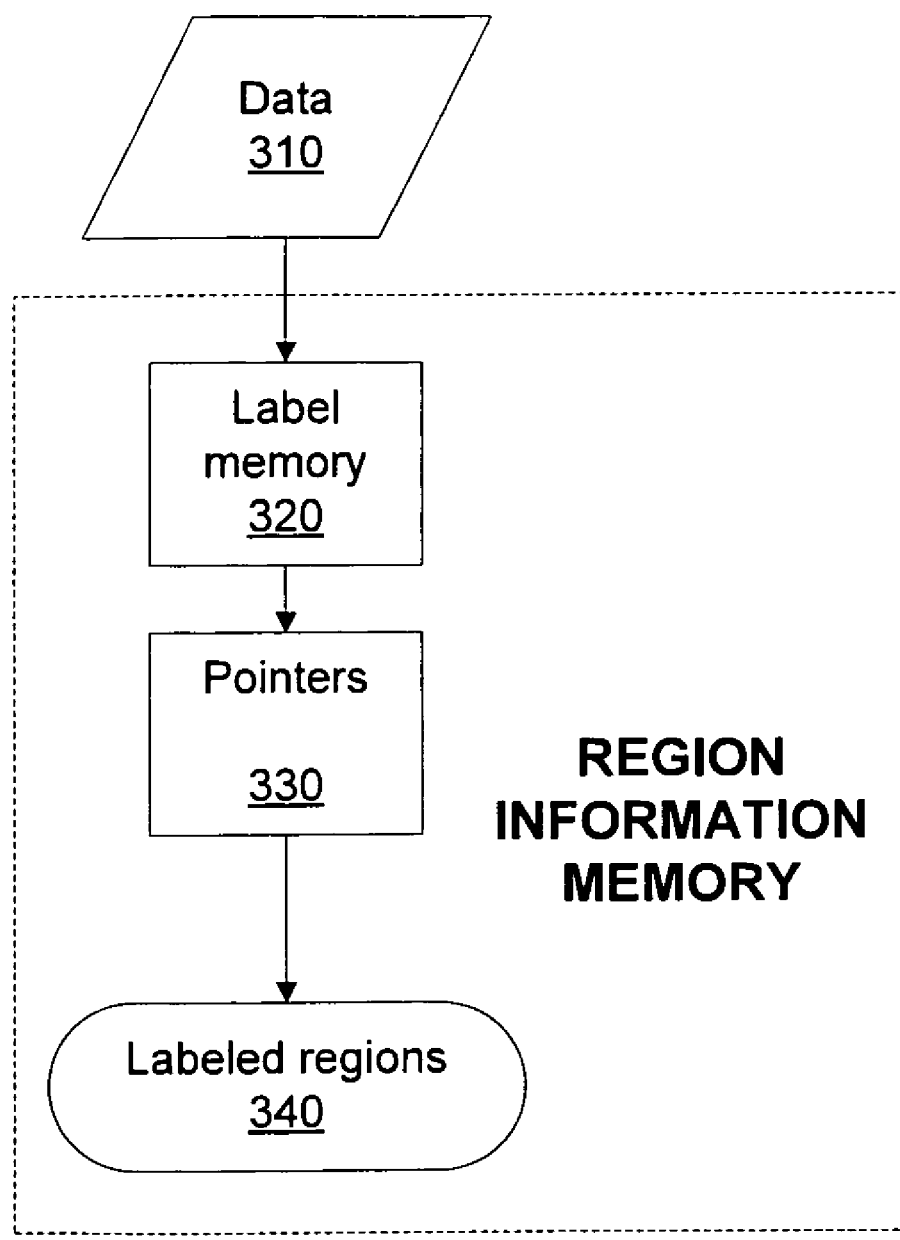
FIG. 3 is a schematic diagram illustrating an embodiment of region information memory in accordance with an embodiment of the present invention.

Block 230 provides for setting up a memory array with a 1:1 correspondence to a data array. More particularly, the data in the data array is labeled by setting up a memory array that is addressable in a 1:1 correspondence to the data array. For example, if the data is indexed by p(x, y), then the labels can be indexed by Lp(x, y). Depicted within block 230 is optional block 2302 which provides for using memory with a linear address space. Thus, labels can be indexed by p(m), where m is equivalent to (x, y), for example m=(y* w)+x. Additional or optional appropriate spatial conversion and/or memory address offset calculations may be required. For example, the memory address and contents will be Label[73]=73 and Label[74]=73 for the example. Regions 73 and 74 are merged. Referring to FIG. 3, an exemplary CCL operation on label memory is illustrated. As shown, raw data 310 is identified as regions 73 and 74 as labels in label memory 320. Next, labels are connected by pointers 330 and finally, labeled regions 340 are produced, such the region identified by label 73.

Additionally, some region qualities might be collected such as region size, shape, or color. Region qualities can be combined such that no more memory is required to store the result of combining regions. For example, "average region color" will require the same amount of storage space regardless of how many regions were combined during segmentation. The region qualities are stored in memory addressed by region labels with address conversions and/or offsets as needed.

Figure 4:
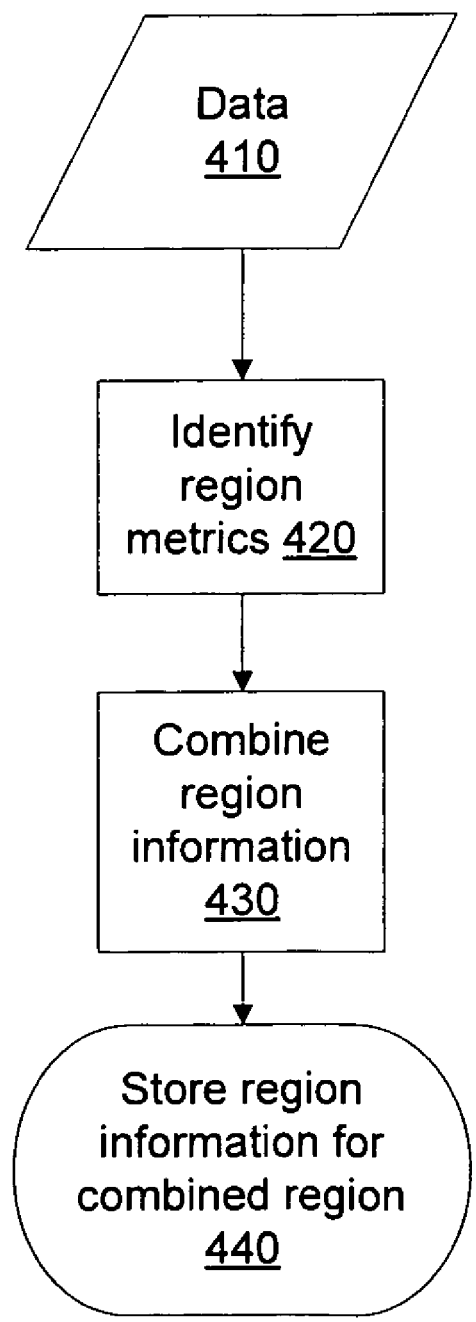
FIG. 4 is a flow diagram in accordance with an embodiment of the present invention.

The CCL operations on region information memory are illustrated in FIG. 4. Specifically, as shown, there can be four regions. Raw data 410 is identified (block 420) as region metrics in region information memory, the region information in 74 is then combined with 73 in block 430, and region information for region 73 is then stored as a combined region 440. Each of the memory areas have the same indexing scheme taken from the original data label such that the original data label provides the raw data index, data label index, region label index and region information index. The same indexing scheme can provide different kinds labels for data, region, border information and other types of information about the raw data 410.

Figure 5:
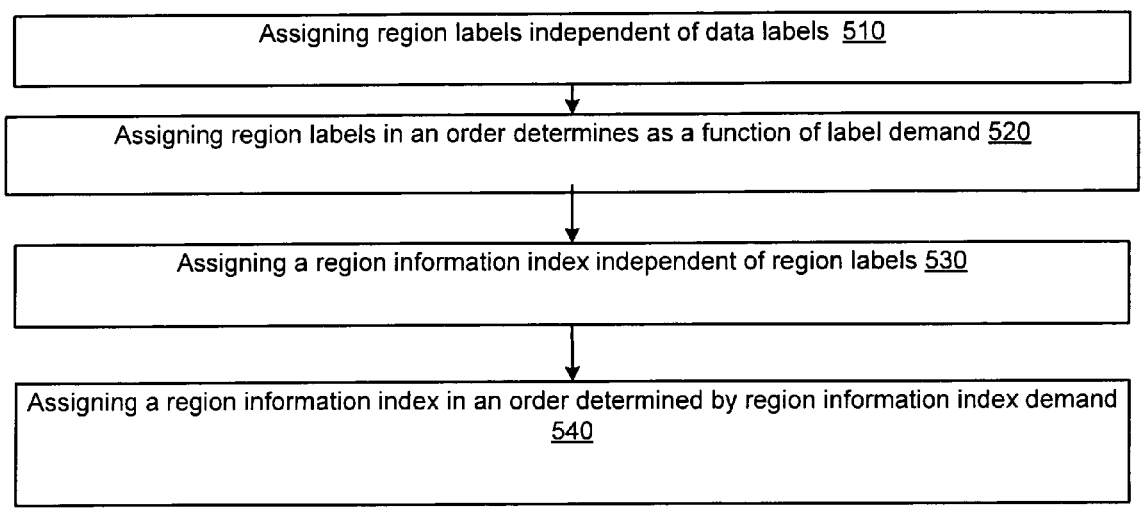
FIG. 5 is a flow diagram in accordance with an embodiment of the present invention.

Referring now to FIG. 5, an embodiment is directed to a method for storing region data. Block 510 provides for assigning region labels independent of data labels. Rather, block 520 provides for assigning region labels in an order determined as a function of label demand. Block 530 provides that a region information index is assigned independent of region labels. Rather, block 540 provides for assigning a region information index in an order determined by region information index demand. As a result of the independence from data labels and region labels, it has been discovered that line buffer segmentation processes are supported and Union-Find and Find-Root algorithms are supported while minimizing memory usage. Moreover, assigning an order based on index demand can be applied to different types of data. For example data labeling beyond data and region labeling can include border data, color data, subregion data, and stochastic data.

Line Buffer

A line buffer, for purposes of the present disclosure, can include one or more lines of memory, each line of memory containing a line of data, which can be image data. The data may be stored in different formats, such as a run length encoded (RLE) format. The data locations making up the lines of memory and the lines of memory making up the line buffer may or may not be contiguous memory locations.

Figure 6:
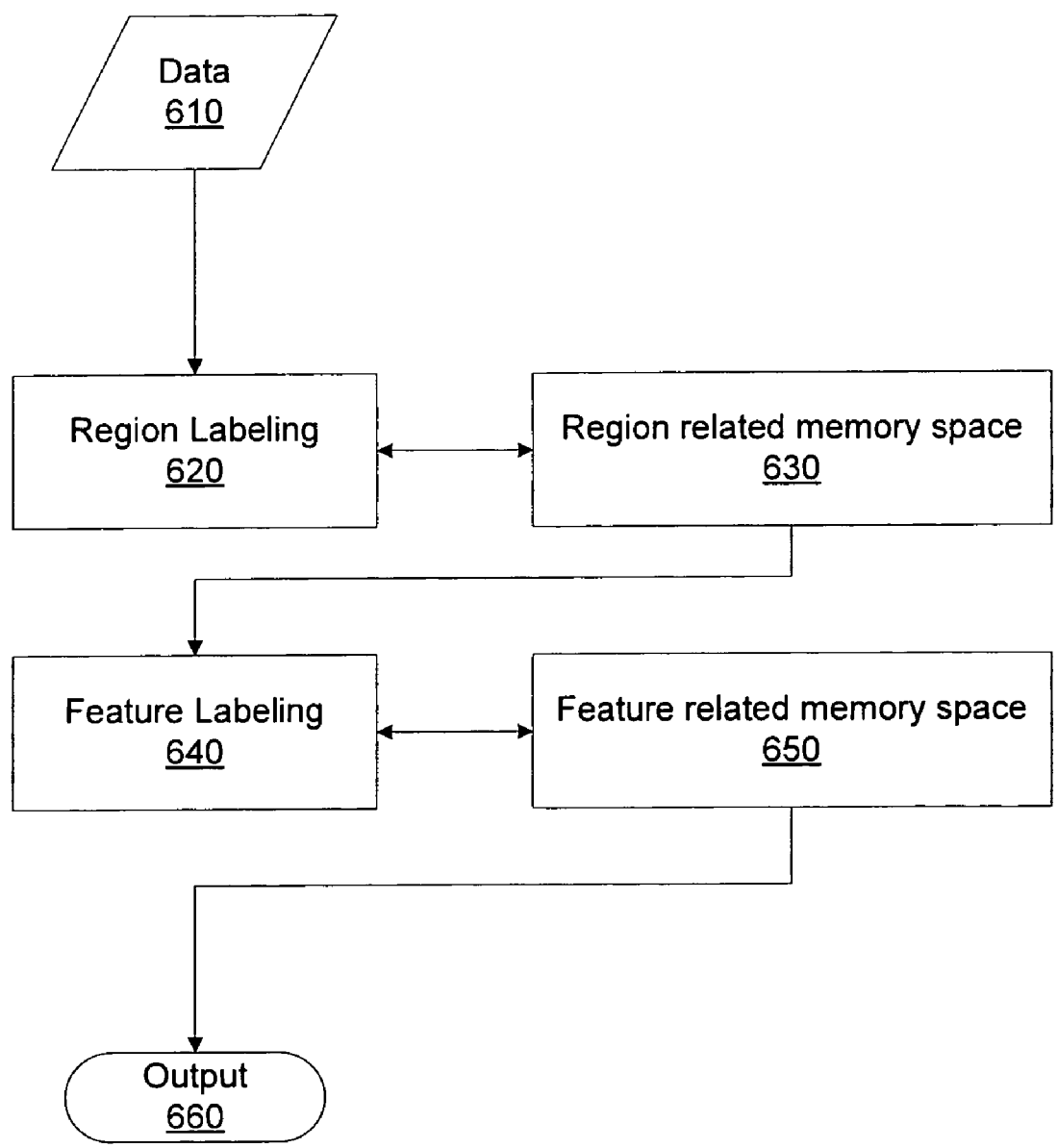
FIG. 6 is a flow diagram in accordance with an embodiment of the present invention.

Referring now to FIG. 6, a method for operating a CCL using a line buffer is illustrated. More particularly, a data stream from a video camera or computer network can be processed in a data buffer (memory) by writing the newest line of data at the bottom of the buffer while moving all of the existing data in the buffer up one row. As a result, segmentation methods are supported that can operate on data in line buffers. For example, a segmentation process can be executed such that the upper lines of the buffer are completely segmented before the lower lines of the buffer.

Block 610 provides for moving all of the data in a line buffer up one row when a top row of data is fully segmented. Block 620 provides for entering the next data line in the bottom row of the buffer. Block 630 provides for segmenting the data in the buffer. Block 640 provides for moving all the data in the buffer up one row when the top row of data is fully segmented. Block 650 provides for entering the next data line in the bottom row of the buffer. Block 660 provides for repeating the process until complete.

Referring back to FIG. 2A, the line buffer is illustrated can that is appropriate for embodiments. More particularly, FIG. 2A includes several lines and illustrates apparent movement of the line buffer over the input data, such as an image. Advantageously, instead of buffering the full image, only a few lines at a time are stored in memory. Further, the actual xy coordinates of data can be derived from the xy coordinates in the buffer along with the location of the buffer over the complete data array. Next, region labels are assigned to the data buffer locations.

Figure 7:
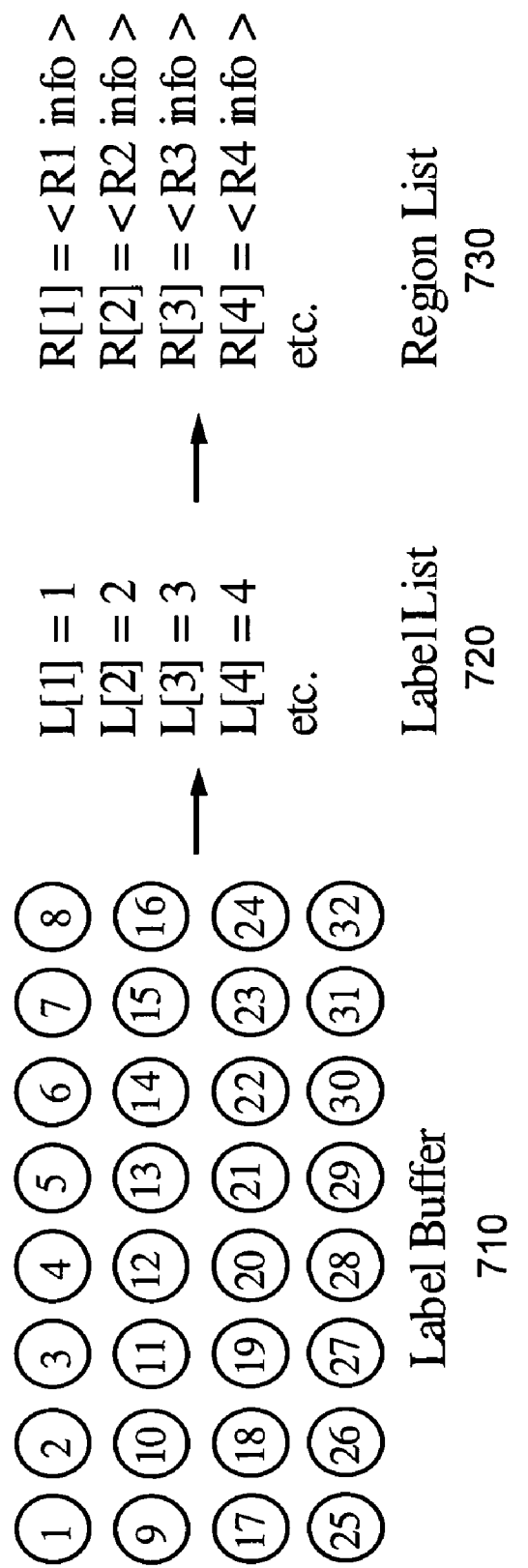
FIG. 7 is a schematic diagram illustrating label buffer, label list and region list storage in accordance with an embodiment of the present invention.

Referring now to FIG. 7, labeled "prior art", a label buffer 710 is illustrated on the left, followed by a label list 720 and a region list 730 is illustrated on the right. The labels in a region buffer point to the region list 730 which also points to the list of region structures located in memory.

Arbitrary Labeling

Figure 8:
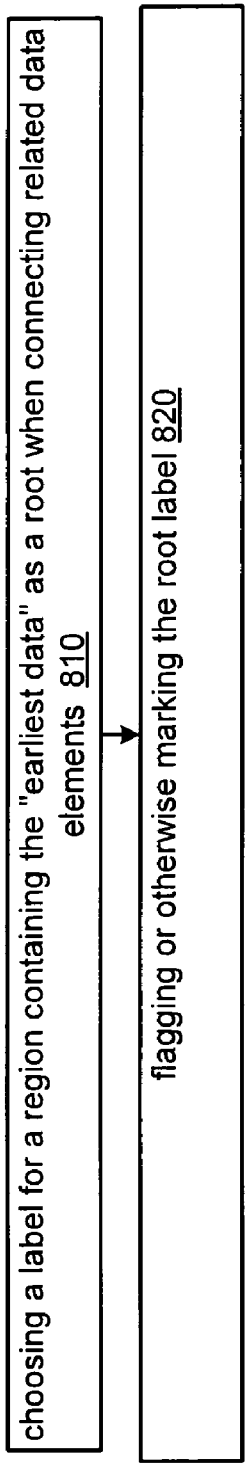
FIG. 8 is a flow diagram in accordance with an embodiment of the present invention.

According to an embodiment, label index allocation can be arbitrarily assigned such that labels have a random quality. For example, a label allocation can be assigned 1, 8, 2, 25, etc., such that labels are neither in increasing order or in an ordered sequence. Further, labeling can be performed such that the relationship between data labels, region labels, and region information indices is made more independent while maintaining label coherency, thereby enabling arbitrary and independent labeling. Referring to FIG. 8, a flow diagram illustrates a method for enabling arbitrary and independent labeling for CCL. Block 810 provides for choosing a label for a region containing the "earliest data" as a root when connecting related data elements. For example, for the raster-ordered example, the top row is y=0 and the first column is x=0. A segmentation process might expect labels ordered as shown on the top two rows. The "earliest data" will have the lowest result for $((y*w)+x)$. The data labeled 91 and 75 are linked. Label 91 is selected as root according to the test. According to an embodiment, other conventions for selecting the root label can be adopted.

Block 820 provides for flagging or otherwise marking the root label. Specifically, the root label no longer points to itself, so the root label is flagged or marked. For example, an unused memory bit may be set.

Figure 9A:
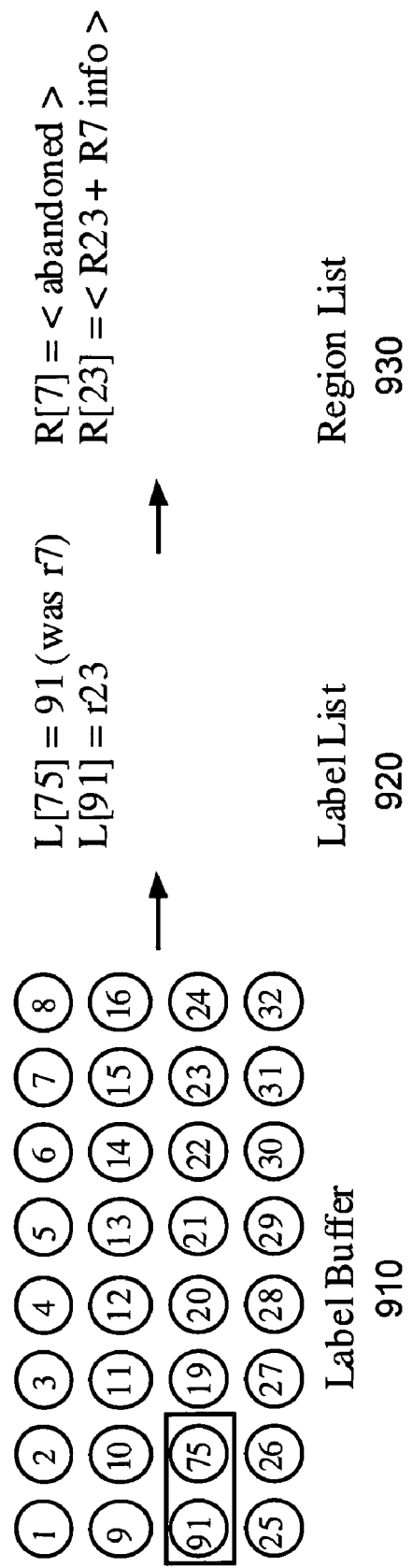
FIG. 9A is a schematic diagram illustrating an alternate embodiment of the present invention.

Referring to FIG. 9A in combination with FIG. 7, label buffer 910 includes an arbitrary label "91" that is arbitrary but indexed by label list 920 to location r23. Region list 930 identifies region R[23] as including r23 and r7 information. According to an embodiment, the flagged root label contains the region list index. In the example, the "r" in the label list 920 at L[91] indicates a region list index. L[75] has had its original r7 index overwritten by a pointer to L[91].

Label Reuse and Memory Allocation Efficiency

Referring now to FIG. 9B, a method for label reuse is shown in a flow diagram. Block 940 provides for assigning one or more labels to one or more groups of raw data representing one or more regions by designating one or more data structures as containing information about the one or more regions. For example, label buffer 910 in FIG. 9 can interact with instructions received from a module, ASIC or the like. Block 950 provides for connecting the one or more labels determined to be related. Block 960 provides for choosing a root label for the connected one or more labels, the root label determined by locating an earliest data element from the one or more groups of raw data. In one embodiment choosing a root label for the connected one or more labels includes determining the earliest data element according to a lowest result for $((y*w)+x)$ wherein y represents a row value, x represents a column value, and w represents a width value. The earliest data element can be according to a first-in-first-out (FIFO) algorithm for raster-organized data arrays. The choosing can also be accomplished by flagging the root label by setting an unused memory bit when a prior root label no longer points to itself.

Block 970 provides for altering a label list of the one or more labels, the label list altered by flagging the root label to include a region label index. For example, the altering can include flagging the root label by setting an unused memory bit when a prior root label no longer points to itself.

Block 980 provides for overwriting one or more region label indexes according to the root label. Thus, region label indexes are reused. For example, a pointer can be provided to the root label.

Figure 9C:
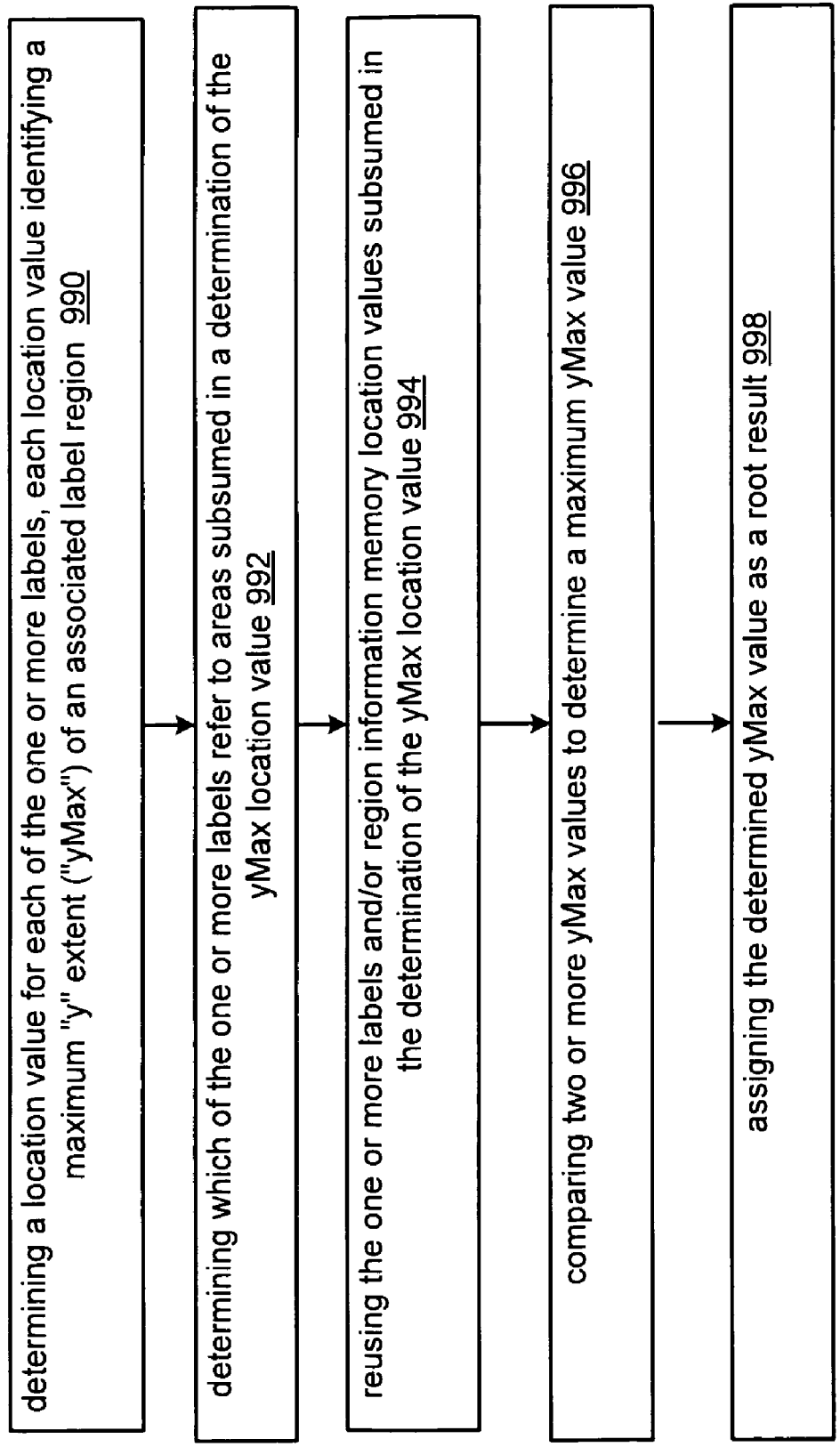

Referring now to FIG. 9C a flow diagram illustrates a method for reusing one or more labels in a connected component labeling system. Block 990 provides for determining a location value for each of the one or more labels, each location value identifying a maximum "y" extent ("yMax") of an associated label region. For example, determining a location value can include assigning as the yMax value a y coordinate for each label of the one or more labels located in a memory, the y coordinate assignment based on a row level in the memory. In one embodiment, determining the y coordinate can be a function of the row level in the memory wherein the memory is a data buffer configured to receive label and region information in a receiving row. In an embodiment, determining the row level can be according to raster order of rows wherein the rows of are formed by moving data up from a bottom row to a top row. For example, label and region information could include receiving in the memory and determining the y coordinate as a function of the row level in the memory wherein the memory is a data buffer configured to receive label and region information in a bottom row.

Block 992 provides for determining which of the one or more labels refer to areas subsumed in a determination of the yMax location value. When determining which of the lables refer to areas subsumed, an embodiment directs storing a location of each root in an associated region information location to enable label comparison during subsuming of label data.

Block 994 provides for reusing the one or more labels and/or region information memory location values subsumed in the determination of the yMax location value.

In one embodiment, the method for reusing includes determining that a row of the memory is fully processed and/or about to be overwritten. Next, for each label in the fully processed and/or about to be overwritten row, the method directs comparing each yMax value to a y coordinate for the row. For each yMax value that matches the y coordinate, the method calls for designating an associated label as an available label. For each yMax value that does not match the y coordinate, the method then directs determining that the yMax value is associated with a series of labels. Next, the method compares each yMax value in the series of labels to the y coordinate. For each yMax value in the series of labels that matches the y coordinate, the method designates an associated label as an available label.

In another embodiment, the reusing includes determining whether the one or more labels and/or region information memory location values are part of a tree structure and locating a root of the tree structure to enable reusing an associated label and/or region information memory location value associated with the root.

In another embodiment, the reusing includes enabling each yMax location value to propagate from root value to root value of each region such that each region root contains a yMax location value that is an actual maximum y coordinate.

Block 996 provides for comparing two or more yMax values to determine a maximum yMax value. Block 998 provides for assigning the determined yMax value as a root result.

Figure 10A:
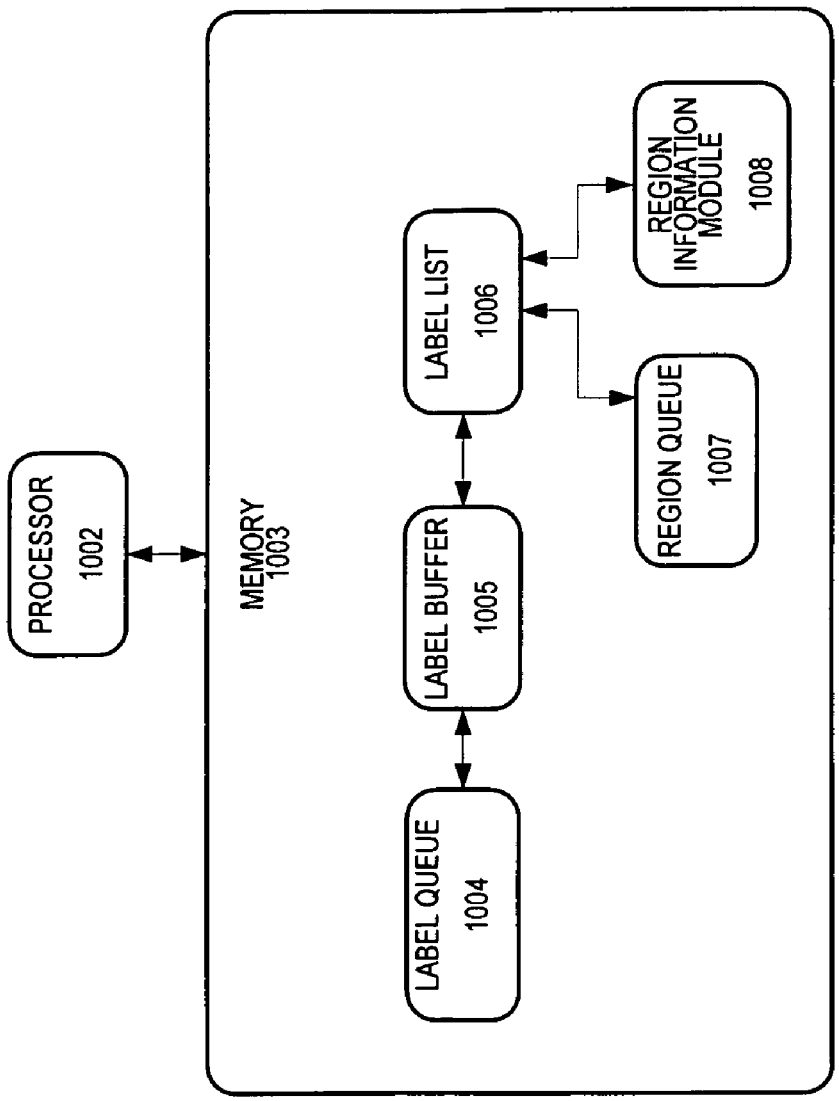
FIG. 10A is a system diagram illustrating a system in accordance with an embodiment of the present invention.

Referring now to FIG. 10A, a connected components labeling system appropriate for enabling label reuse is illustrated. FIG. 10A shows a processor 1002, and a memory 1003 coupled to the processor 1002. Memory 1003 includes a label queue 1004 that stores inactive, closed, and/or not currently in use labels and dispenses new labels to the label buffer block 1005 as required. The label queue 1004 receives closed labels no longer required by label buffer 1005 or label list 1006, the inactive labels being determined by the yMax method. Label buffer 1005 is shown coupled to the label queue 1004. and configured to contain a plurality of locations for holding one or more region labels for the connected components labeling system and Label buffer 1005 is configured to be initialized with a sequential count at the beginning of an operation for each array of input data in a raster order. Further, label buffer 1005 holds current labels in use during an operation, and is independent from the height of a connected region.

FIG. 10A also illustrates a label list 1006 coupled to the label buffer 1005 and the label queue 1004. Label List 1006 contains the memory locations pointed to by the labels in the label buffer. Each memory location contains a label (pointer or index to another memory location) or if the label is root, the memory location contains a label (pointer or index) to a region information location.

FIG. 10A further includes region queue 1007 coupled to label list 1006. Region queue 1007 can be configured to send and receive a plurality of region information locations equal to a number of possible roots. FIG. 10A further can include region information module 1008 coupled to label list 1006. In an embodiment, region information module 1008 outputs region information wherein the maximum number of region information locations is equal to the number of possible roots, the number of region information locations being a fraction of the maximum number of region information locations.

Figure 10B:
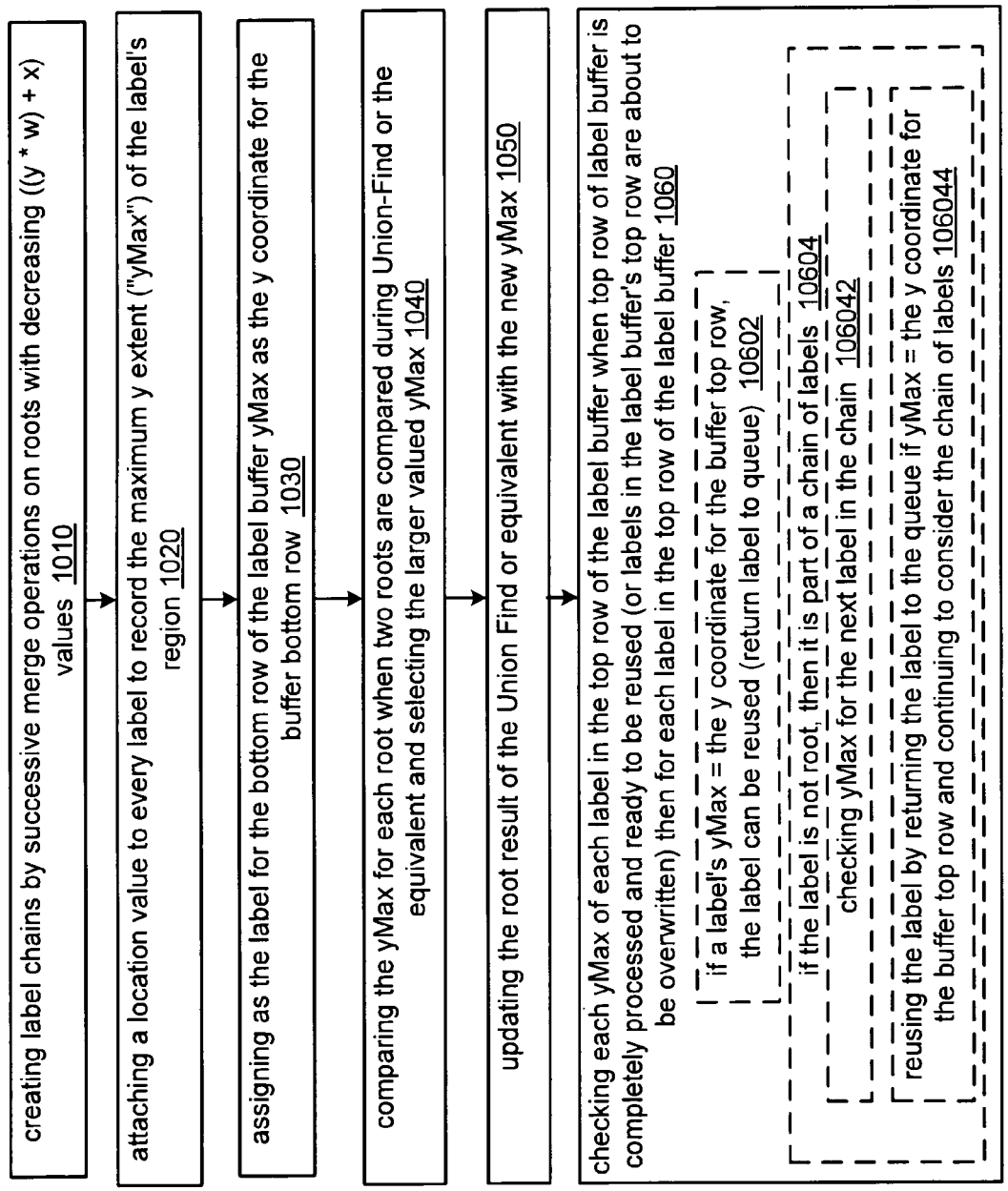
FIG. 10B is a flow diagram illustrating a method in accordance with an embodiment of the present invention.

Referring now to FIG. 10B, another embodiment is directed to enabling reuse of label and region information in memory locations that are no longer needed. More specifically, one problem is that labels that are not roots and no longer in use inside the buffer area may be required by a Find-Root function. Block 1010 provides for creating label chains by successive merge operations on roots with decreasing ((y*w)+x) values. For example, a chain of labels such as 5-65-74-342-2-57 (root) might be created. If any of these labels is destroyed, a Find-Root on 5 will not return 57. Even if 65, 74, 342, 2 and 57 have moved out of the buffer and are no longer being processed by segmentation, an attempt to perform segmentation with label 5 will fail. The problem is that there is no way to detect when a label is no longer needed without scanning the whole label list.

Block 1020 provides for attaching a location value to every label to record the maximum y extent ("yMax") of the label's region. The y extents are the top and bottom locations of a region's spatial location. In one embodiment, the method provides that only the root result of each Union-Find operation has the yMax value updated. Even if some method other than Union-Find is used there is still an implicit comparison of two roots from which one root will remain. Only two operations are required, compare and write, both of which can be executed in parallel with other Union-Find operations so that no time or delay is added to the CCL process.

Block 1030 provides for assigning as the label for the bottom row of the label buffer yMax as the y coordinate for the buffer bottom row.

Block 1040 provides for comparing the yMax for each root when two roots are compared during Union-Find or the equivalent and selecting the larger valued yMax. Block 1050 provides for updating the root result of the Union Find or equivalent with the new yMax.

Block 1060 provides for checking each yMax of each label in the top row of the label buffer when top row of label buffer is completely processed and ready to be reused (or labels in the label buffer's top row are about to be overwritten) then for each label in the top row of the label buffer. More specifically, block 10602, depicted within block 1060 provides that if a label's yMax= the y coordinate for the buffer top row, the label can be reused (return label to queue), which optimizes memory usage. Block 10604, also depicted within block 1060 provides that if the label is not root, then it is part of a chain of labels. Block 106042 provides for checking yMax for the next label in the chain. Block 106044 provides for reusing the label by returning the label to the queue if yMax= the y coordinate for the buffer top row and continuing to consider the chain of labels. Chains in accordance with an embodiment can be created by successive merge operations. Successive merge operations propagate higher yMax from root to root. As the chain is traversed to root, yMax can not decrease. Label chains and label reuse in connected component labeling enables processing for any sized object. More specifically, the yMax procedure explained above is agnostic to at least one dimension of data, which enables segmentation and CCL in a line buffer. Moreover, by successive application of the yMax procedure, the number of dimensions of data can be extended as needed by system requirements.

As a result of the method described in FIG. 10B, the CCL is based on merging regions by pointing one region root at another region root resulting in one root, thereby making every region have one root. Further, only a region's root yMax is updated. Further, every label is either root or has been merged as root at least once during the process. Further, only roots are merged. After operating the method, the yMax propagates from root to root. Therefore, for every region, the region root contains the yMax that is the actual maximum y coordinate for that region. The non-root labels in the region are part of a chain of pointers to root. No labels will escape reuse, even if several chains combine before the root is reached (tree structure). Therefore, the method reuses labels completely, and no labels are missed.

In one embodiment, when a label and label memory is initially allocated for use, for example, when a label is applied at the bottom of the buffer, or when a region info structure is filled with a new label's data, the memory space is termed "opened." When the memory space is no longer needed and can be reused it is "closed."

As a result of reusing labels and the methods as described above, the region information memory locations that were potentially unused after region merge operations are now known to be available for reuse, which optimizes memory. For every merge operation between two regions, one region label will no longer be root. Every root label has a corresponding region information structure in memory.

From the time a label is no longer root to the time the label is closed by the yMax technique, the region information structure for that label is unused. In an embodiment, yMax is stored in the label list instead of the region list. Because yMax is stored in the label list, the non-root region info structure has no useful information. As a result, the region info structure can be closed as soon as the region label pointing to it is no longer root. Therefore, for every region merge operation, one region info structure can be closed. The region info locations pointed to by the root labels can be closed when the corresponding root label is closed according to yMax.

Note that if linking conventions need to be maintained, then the actual (x, y) location of each root can be included in the region info locations. The actual (x, y) is useful for comparing labels to choose root during merge operations.

As a result of the method described both region labels and region information structures now have exact conditions when they can be closed. Memory usage is made maximally efficient because memory locations are closed as soon as the memory location is no longer needed. Region labels can be closed when yMax is satisfied. When a root label is closed by the yMax method, the associated region information structure can be closed. When a root label becomes a non-root label during region merging, the non-root region information memory space can be closed. In one embodiment, the method using yMax is also key to making the line buffer technique work for CCL. Thus, any size region can be segmented in any size line buffer, which is a tremendous savings in memory and a breakthrough for CCL in embedded applications.

Label Queue

A problem with label queuing includes the closing of region labels and region information locations in an unpredictable order. CCL works with arbitrary labels if the methods disclosed herein are applied. The labeling methods herein described enable reallocation and opening of labels and region information locations in the order in which they were closed.

The number of labels required for the CCL methods disclosed herein efficiently result in less than the width multiplied by height amount of labels required with known techniques. The number of labels required as herein disclosed is a function of both buffer size and a chosen segmentation method. Specifically, the number of labels increases with the size of the buffer; the number of labels decreases with the increase in aggressiveness and/or effectiveness of a chosen segmentation method. Label requirements also vary with differing image or data conditions. Fore example, an image with many objects can require many labels. Therefore, according to an embodiment, a method allows for optimization of memory usage according to one or more of image conditions, application requirements, and/or segmentation techniques. More specifically, in an embodiment, image conditions can be such that memory must be allocated for fine details and an embodiment addresses the label requirement for such known conditions. For example, an image of a detailed tree could require memory allocation for leaf regions. In contrast, a memory allocation that prioritizes application usage could be configured to ignore leaf detail requirements in memory. Likewise, a memory allocation that prioritizes segmentation techniques could ignore leaf details as well.

Referring now to FIG. 11, a flow diagram illustrates a method in accordance with an embodiment. Describing the required number of labels as maxLabels, the required number of region information locations is smaller than maxLabels. Allow the data name maxInfo to represent the number of region information locations.

Block 1110 provides for creating a circular buffer, or "queue," with maxLabels locations holding all of the region labels. Block 1120 provides for creating an array "LabelQueue[maxLabels]" as a circular list with a head and tail index. Block 1130 provides for opening a next label as openlabel=label[head]. Block 1140 provides for returning a closed label to the list at label[tail]=closedlabel. Block 1150 provides for initializing the label list with label[i]=i, i=0 . . . maxLabels.

Initially, head=0 and tail=0. Thus, labels are first opened in ascending order, 0-maxLabels. Labels return to the circular list for reuse in the order closed. The label list will become disordered but will remain correct (tail will not overtake head), because there can only be a maxLabels number of labels open at a time.

The RegionQueue[ ] also follows the same method described in FIG. 11.

In an alternate embodiment, block 1160 provides for reducing the label queue size by initializing the label buffer with a sequential count at the beginning of a segmentation or CCL for each full array of input data. For example, when a new image is to be segmented or labeled via CCL, the method directs initializing the label buffer from a counter with a sequential count applied to each buffer location in raster order. As a result, the label queue size required is large enough to contain the number of labels that might be required to label chains and roots for the portion of regions that extend outside the top of the label buffer.

The absolute maximum number of region info locations is equal to the number of possible roots, i.e., the number of locations in the line buffer plus one row. The actual number of region information locations results in some fraction of the maximum unless a segmentation error occurs.

In accordance with embodiments disclosed herein, the maximum number of labels becomes greater than the maximum number of roots due to label chains that cross the top row of the buffer. More specifically, the maximum number of labels results in the number of buffer locations plus an estimate for the number of links outside the buffer on chains that cross the top row of the buffer, plus the number of roots above the top row of the buffer for regions that cross the top row of the buffer.

Figure 12:
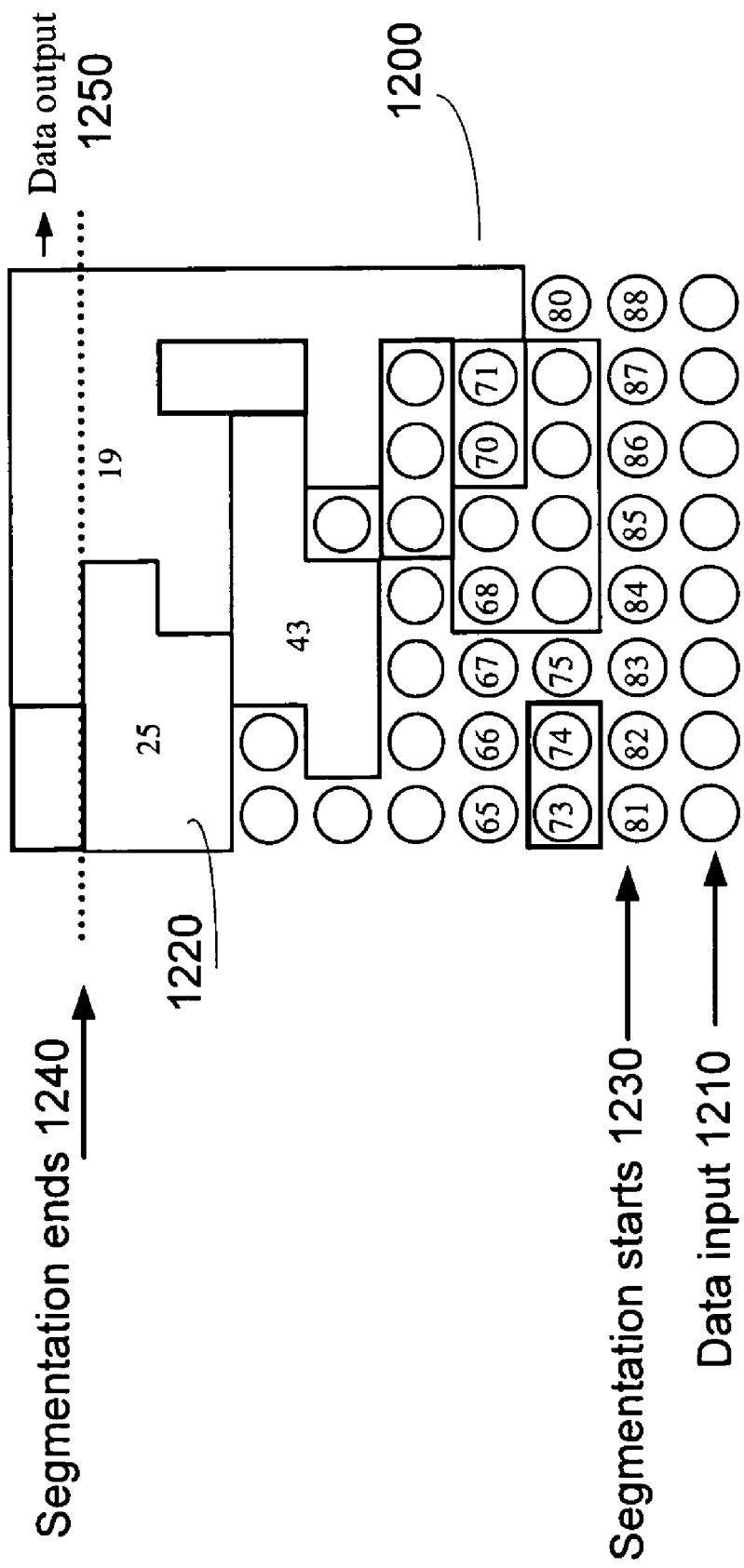
FIG. 12 is a schematic diagram of a label buffer in accordance with an embodiment illustrating how regions are combined and propagated in accordance with an embodiment of the present invention.

Referring now to FIG. 12, segmentation performed on a line buffer 1200 is illustrated showing the flow of data through the buffer. The raw data input 1210 is grouped with similar neighbors until larger regions 1220 are created. As the data moves up from the start of segmentation 1230 through the buffer until segmentation ends 1240, the regions in buffer 1200 become larger.

At the top of the line buffer 1200, segmentation is practically finished and the 1:1 relationship between labels and raw data locations is at an end. The result of segmentation needs to be acquired from the top line at data output 1250. Segmentation precedes feature labeling, or the data is in a form that is effectively segmented. For example, text made of black characters on a white background. For ease of discussion, the input to feature labeling will be shown as line segments that are considered to be already labeled; the regions are known. The use of line segments does not preclude the use of Feature Labeling on unsegmented, unlabeled, or raw data.

Line Segments from Segmentation Labels

Figure 13:
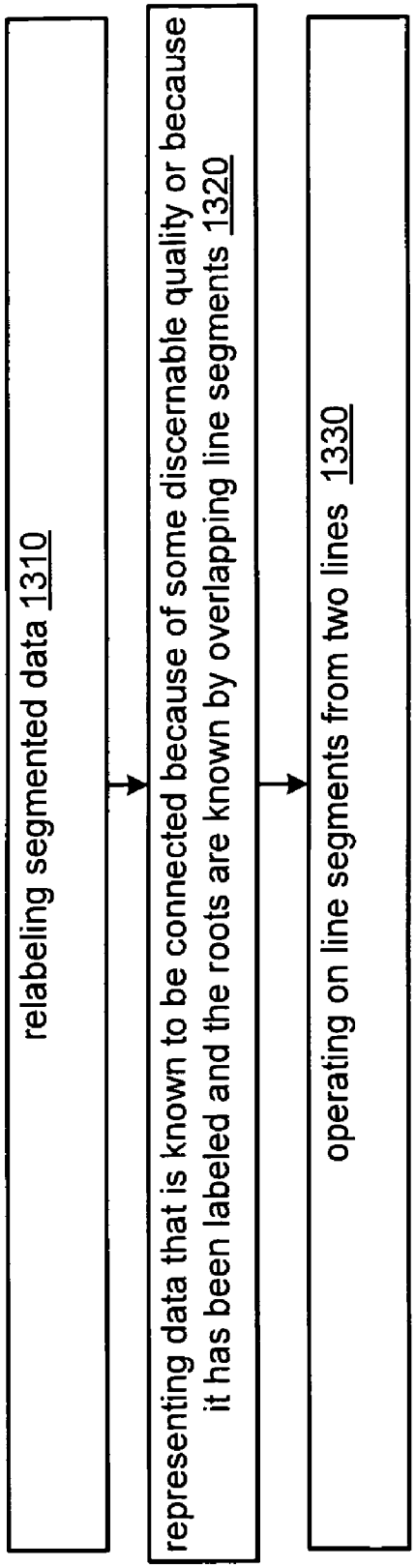
FIG. 13 is a flow diagram illustrating a method in accordance with an embodiment of the present invention.
Figure 14:
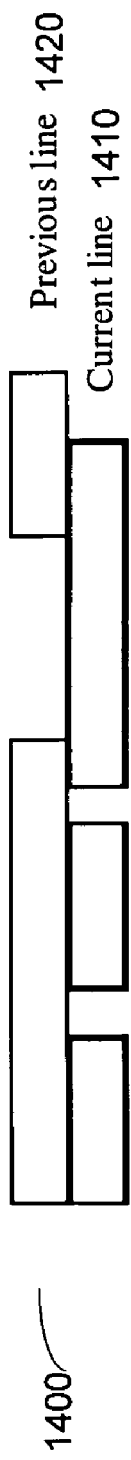
FIG. 14 is a schematic diagram of a label buffer current line and previous line in accordance with an embodiment illustrating in accordance with an embodiment of the present invention.

Referring now to FIG. 13, a diagram illustrates a method for a simple model made of line segments. Labeled line segments represent the input data. Line segments with labels pointing to the same root are considered to be connected. Block 1310 provides for relabeling segmented data. Block 1320 provides for representing data that is known to be connected because of some discernable quality or because it has been labeled and the roots are known by overlapping line segments. Block 1330 provides for operating on line segments from two lines. Referring to FIG. 14, a Features Label diagram 1400 illustrates the simple model with the "Current Line" 1410 representing the newest data or the segmented data from the top of the segmentation label buffer. The "Previous Line" 1420 represents the previous line of input data or the previous line taken from the top of the segmentation label buffer.

Line Segments from Data

Figure 15:
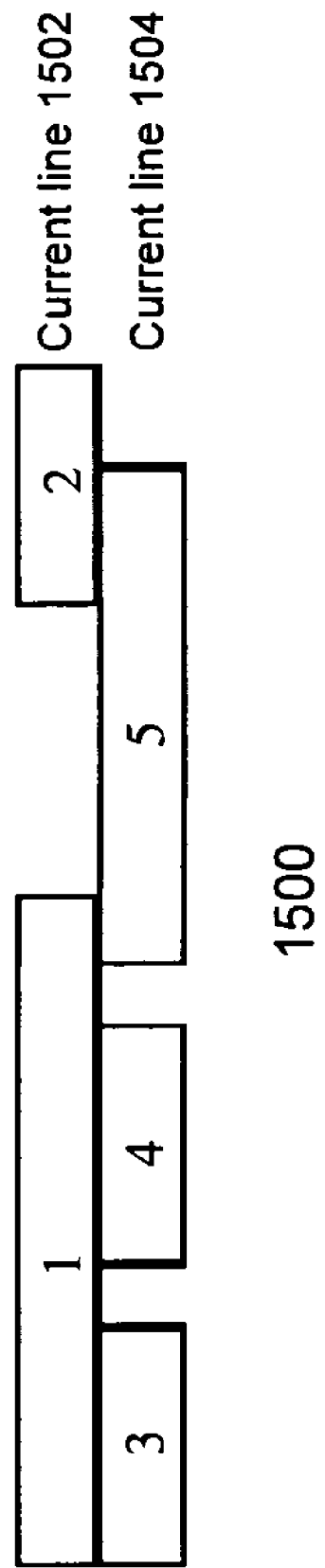
FIG. 15 is a flow diagram illustrating a method in accordance with an embodiment of the present invention.

Referring to FIG. 15, a raster-organized data 1500 is arranged in horizontal lines read left to right. The lines are stacked top to bottom to make a 2-D array such as image data arranged to display an image. For exemplary purposes, this disclosure represents a segment, such as a line segment, as an unbroken sequence of one or more of the same data value organized horizontally on a raster line. Other ways of organizing or representing data can be considered a segment. Data can be Run-Length Encoded (RLE). Other data relationships may be chosen by a user or other relationship choosing automatic or responsive program as required by the application. For example, segments can be created by dissimilar data or data with arbitrary relationships. Non-linear relationships can be applied to the data, such as connecting data based on spatial relationships such as shape.

A common Union-Find data structure is known as the linked-list. Labels are the indexes of the linked list locations and the data of each location is a pointer to another label. The labels are linked by the pointers to associate the labels representing a group of related segments. One of the labels in a linked group is chosen as the region number or "root". Typically, the root is the lowest label number. For example, labels 1, 2, 3, 4, 5, 6, and 7 can point to label 1 as the region number (root). The pointing creates a tree structure wherein the elements (labels 1, 2, 3, 4, 5, 6, 7) point to the root (label 1).

The input data elements are numbered (labeled) and each label is an index of the linked list. For example, data element #3 is listed as Label[3] =3. As the connected data labels are linked, all of the labels will point to the root or region label.

Modified Propagate Last Labeling

According to an embodiment, a method for modified propagated last labeling is provided that enables collection of region features (feature encoding) using only one line of data memory and the equivalent of one line of feature structures. According to an embodiment, the input to Propagate Last Labeling includes using known-connected line segments which are to be relabeled with regard to connectedness but without regard to previous labeling except to take advantage of labels indicating connectedness. In one embodiment, a labeling method numbers and/or labels each of the segments in raster order. In the embodiment, the root label designates the region segments.

Propagated labeling saves memory space by immediately reusing labels. Labels are applied as the data arrives, left to right, top to bottom. Overlapping segments take the label from the segment above.

"Modified Propagate Last" refers to an embodiment that abides by a labeling rubric in which any label occurs at most once per line; segments below take the label of the overlapping segment above; if one segment above overlaps more than one segment below, the first segment below gets the label from the segment above; if more than one segment above overlaps one segment below, the segment below takes the label from the last overlapping segment above.

The rubric enables exposing all spatial details of the region; also, labels designate unique areas of a region containing spatial details. Moreover, the rubric enables a very efficient hardware process. All of the necessary segment and label states are known at the end of each segment on the current line for labeling that segment. Therefore Feature Labeling can proceed as data arrives with one line of memory for buffering the label process.

Figure 16:
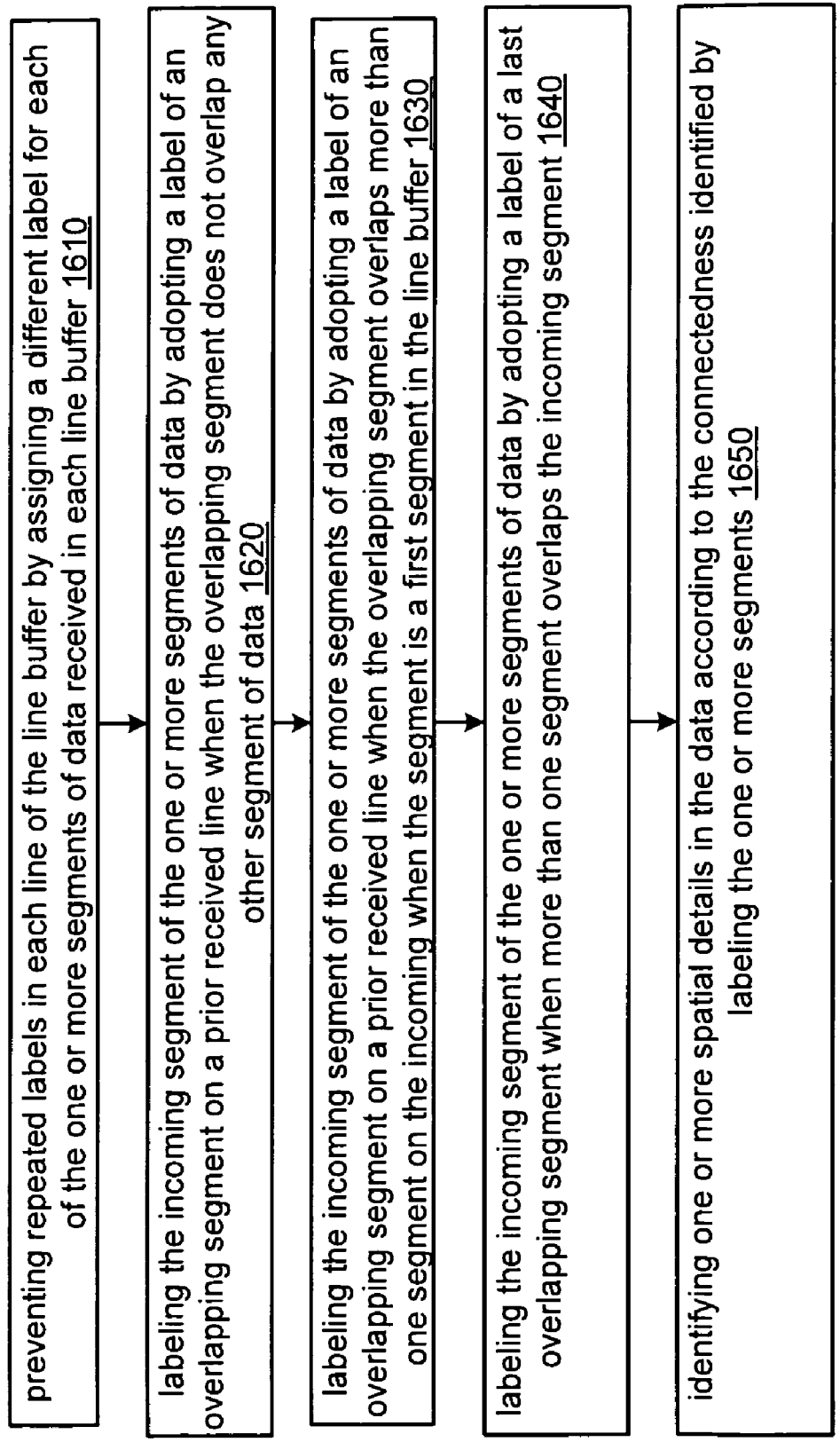
FIG. 16 is a flow diagram illustrating a method in accordance with an embodiment of the present invention.

Referring now to FIG. 16, the modified propagated last labeling method is illustrated that enables exposing of all spatial details of a region. Specifically, block 1610 provides for preventing repeated labels in each line of the line buffer by assigning a different label for each of the one or more segments of data received in each line buffer. Block 1620 provides for labeling the incoming segment of the one or more segments of data by adopting a label of an overlapping segment on a prior received line when the overlapping segment does not overlap any other segment of data. Block 1630 provides for labeling the incoming segment of the one or more segments of data by adopting a label of an overlapping segment on a prior received line when the overlapping segment overlaps more than one segment on the incoming when the segment is a first segment in the line buffer. Block 1640 provides for labeling the incoming segment of the one or more segments of data by adopting a label of a last overlapping segment when more than one segment overlaps the incoming segment. Block 1650 provides for identifying one or more spatial details in the data according to the connectedness identified by labeling the one or more segments.

The segments can be received from raster-organized data arrays wherein the data is image data arranged to display an image, and/or can be from an unbroken sequence of a data value organized horizontally on a raster line, and/or can be run-length encoded data and/or data encoded by a user-directed application.

For clarity, the convention will be to refer to "unique areas of a region containing spatial details" as "features." Labels therefore designate features.

FIGS. 17A and 17B illustrate how modified propagate last labeling according to an embodiment reveals feature locations via an illustration of extents of labels thereby illustrating how all of the features of region 1 are revealed. Specifically, FIG. 17A illustrated a prior art labeling that directs labels 1710 to Region 1 1720 via a prior art process that results in one region for the entire data array. In contrast, FIG. 17B illustrates a label buffer 173 that results in region identification 1740 with several features being made visible.

Figure 18A:
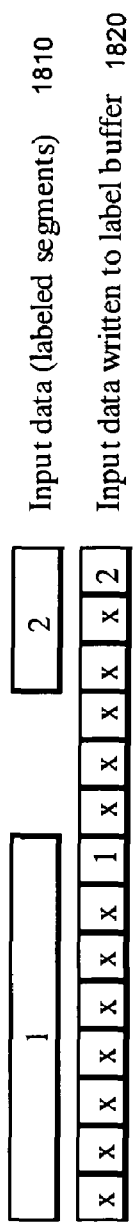
FIG. 18A illustrates data as input data written into a label buffer in accordance with an embodiment of the present invention.

Referring now to FIG. 18, a flow diagram illustrates how to process two lines of labels with a one line buffer. The line buffer data type will be suitable to the data being stored. Although the data may be stored in an RLE compressed format, for clarity purposes FIG. 18A illustrates data as input data that is labeled segments 1810 and input data as written into a label buffer 1820. For example, if the highest valued label can be recorded in one byte, then the line buffers could be bytes of memory with each byte representing a buffer location that corresponds to the spatial representation of a segment.

Various methods for representing and recording labeled segments to the buffer are within the scope of the present disclosure. For example, if the label for the segment is written in the last space of the buffer covered by the segment. In the figures, data in the buffer, "x" in the input data 1820 corresponds with data for which exact data does not matter as long as it is not a label that connects to neighboring segments.

Figure 18B:
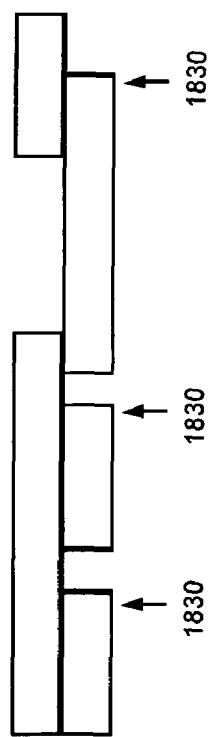
FIG. 18B is a diagram illustrating input data written to a label buffer and labeled segments in accordance with an embodiment of the present invention.

In accordance with an embodiment, the method of using propagate last labeling enables evaluation of segments as they arrive from the input data stream. Each segment is evaluated at the end of each segment 1830 as shown in FIG. 18B.

Figure 18C:
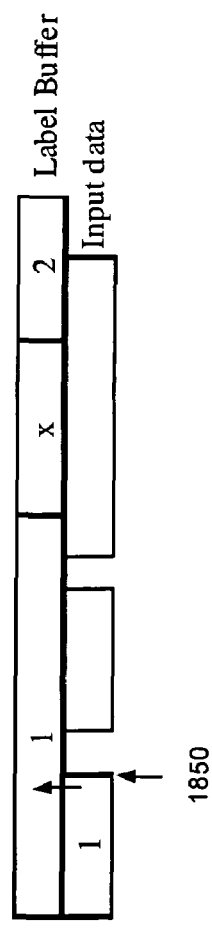
FIG. 18C is a diagram illustrating input data written to a label buffer as compared to input data in accordance with an embodiment of the present invention.

By the end of an input segment, all of the overlapping segments for that segment are known. Therefore, the label for the segment in the line above stored in the Label Buffer can be overwritten by the new label. In FIG. 18C the new label, label 1, is propagated from the segment above. After the segment below is evaluated and labeled, the segment below can overwrite the segment above, as shown by arrows 1850.

As a result of the method, no valuable data in the buffer is overwritten. If the segment in the label buffer representing a segment in the previous line does not extend to the right of the current segment, then the segment above can not overlap with future segments. If the segment in the label buffer representing a segment in the previous line does extend to the right of the current segment, then the portion of the segment above that might overlap future segments is not overwritten.

Reducing Memory Requirements: Closing Features

Figure 19:
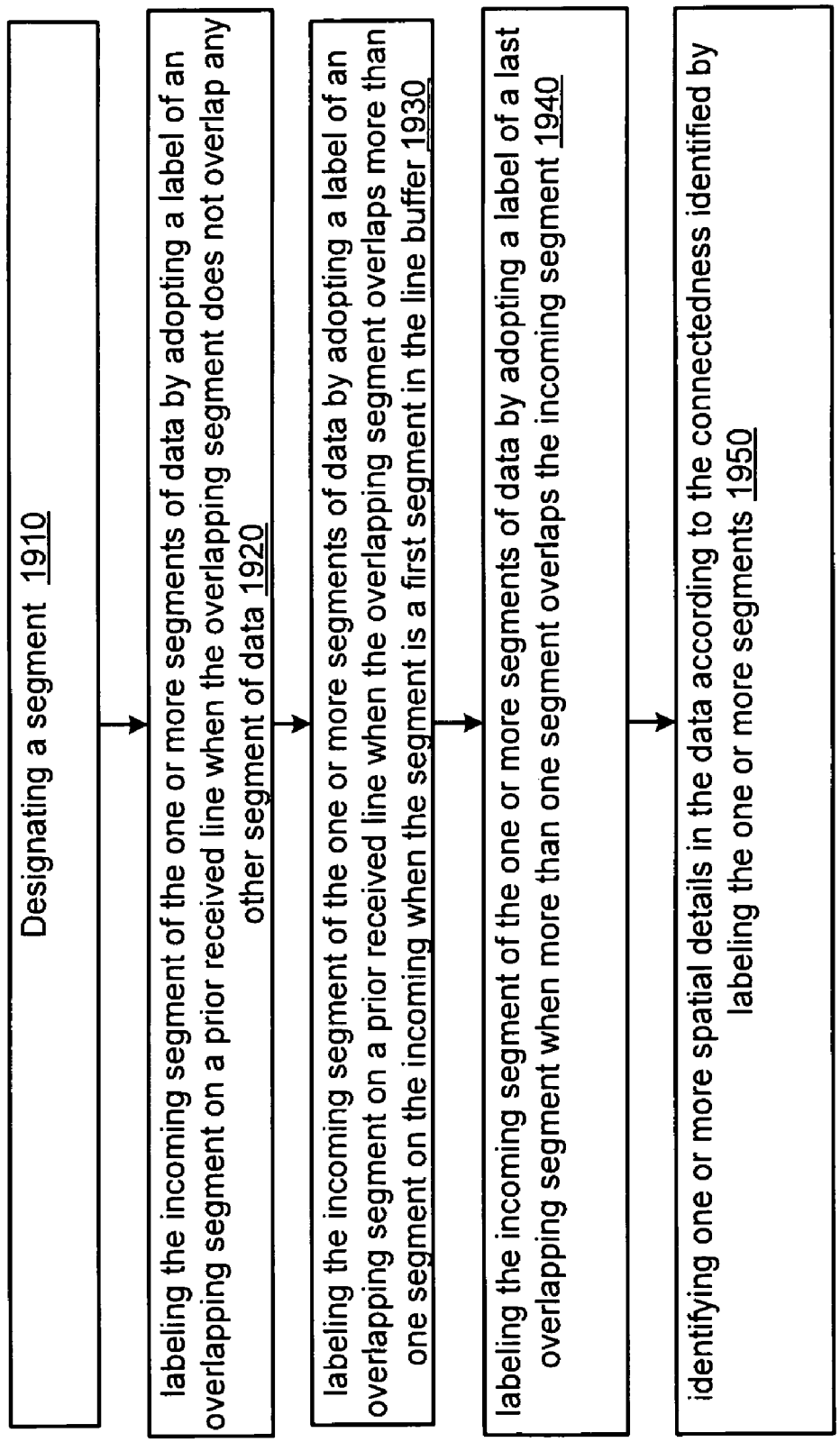
FIG. 19 is a flow diagram illustrating a method in accordance with an embodiment of the present invention.

For purposes of the present disclosure, a label designates a Feature structure that holds the region description (features). As long as a segment on the previous line connects to a segment on the current line, that Feature might still be updated with new information, so that label can be referred to as "open." According to an embodiment, the maximum possible number of open labels is the same as the maximum number of labels on a line. Correspondingly, the maximum number of labels on a line is the number of pixels on a line. If the segmentation process sets a minimum horizontal segment size, then the maximum number of labels on a line is (line width/min segment size). For example, the minimum segment size for a segmented image might be one pixel. Referring to FIG. 19, flow diagram illustrates a method for closing a how the maximum number of labels on a line matches the number of pixels on the line.

As noted, the modified propagated labeling method in accordance with an embodiment allows any particular label to occur at most once on a line. It has been discovered that if the segment on the previous line does not connect to a segment on the current line, it will never connect to another segment for the rest of the image. In accordance with an embodiment, the method takes advantage of the label limit. That segment's label will not be used again and the Feature it points to will not have any more segments added. A result that is counterintuitive is that if a segment on the previous line does not connect to a segment on the current line, the segment label and the Feature it points to can be "closed." There is no reason to maintain the storage of a closed Feature as that Feature will no longer be updated. The closed Feature can be output to whatever receiving process follows the CCL function. For example, the contents of the closed Feature can be written to a First-In-First-Out (FIFO) type memory. Thus, the closed feature can be immediately output to the receiving process, which enables reuse of the feature memory space to conserve memory.

Feature Encoding

According to an embodiment, an efficient method for collecting feature information is provided that uses a compact format for storing and communicating feature information. Specifically, feature encoding herein can include collecting feature information from the raw data, or from the labeled data, or from the region information, and representing that information in a format for collected feature information.

Using raw data enables networked sensors, e.g. cameras, that contain the processing required for communicating with other devices and computers on a network to efficiently pass information. The image processing required for scene understanding in networked cameras is limited by 1) the complexity of existing segmentation methods, and 2) the lack of a method for encoding region information, 3) the fact that each camera only has one viewpoint. Each camera has an isolated viewpoint and limited processing power. Without the feature encoding method disclosed herein, camera networks are forced to waste processing resources on compressing video images, and to burden the network with high-bandwidth pixel representations of camera views. It is currently expensive and difficult to track moving objects as they pass through different camera views. The feature encoding method herein is an efficient method for CCL/segmentation for each networked camera, a low-bandwidth format for communicating region information, and a way to combine the viewpoints of cameras on the network. Feature encoding makes low-cost distributed scene understanding possible.

The actual region property, such as the color red, can be encoded digitally as a number, for example if 42 denotes red, then (red(xmin, ymin, xmax, ymax)) may be represented in digital form as (42, 18, 735, 423, 1024).

The disclosed feature encoding encompasses the extraction and communication of more complex characteristics. For example a series of points marking the boundary of a region can be collected from the endpoints of the line segments, or the region boundary may be described by the coefficients and constants of splines or higher-order curves.

The encoding method herein encompasses various representations of region properties. For example a region texture may be represented digitally as wavelet constants and coefficients. Further, disparate region segmentations can be described. For example, a red colored region has an area that is smoothly textured and an area that is roughly textured (strong edges). An adjoining blue colored region has an area that is smooth and an area that is rough. The smooth areas are contiguous and the rough areas are contiguous. The encoded features may include the red region (blue(x1, y1, x2, y2)), the blue region (blue(x3, y3, x4, y4)), the smooth region (blue (x5, y5, x6, y6)), the rough region (blue(x7, y7, x8, y8)), or combinations such as (rough/blue(x9, y9, x10, y10)), etc.

Feature encoding enables the communication of region information 1) between different parts of a system, 2) between networked computers, 3) between networked computers and networked sensors, 4) between networked sensors. For example one machine vision camera on a network may communicate to another camera on a network "do you see the red ball at location (x1, y1)?" The response from the second camera to the first camera might be "no, I see blue ball at (x1, y1) and a red ball at (x2, y2)." Feature encoding allows local processing of images by networked cameras that share portions of the same view. For example, two cameras observing the same room can communicate to one another the encoded feature information of their respective views, and thereby construct a 3D representation of objects in the room.

Figure 20:
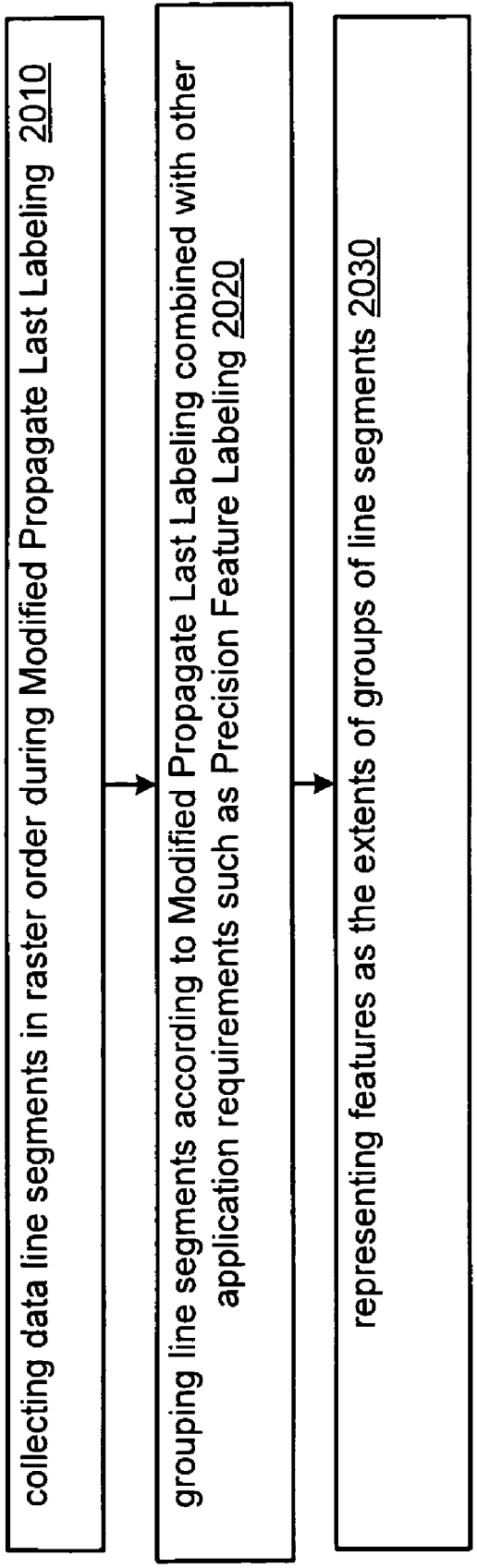
FIG. 20 is a flow diagram illustrating a method in accordance with an embodiment of the present invention.

Referring to FIG. 20, a flow diagram illustrates a method for feature encoding that is based on raw data formatted as a 1D, 2D, or 3D array. The method illustrates that features can be represented as the extents of groups of line segments.

A compact description of region features is efficiently collected from the data array. Block 2010 provides for collecting data line segments in raster order during Modified Propagate Last Labeling. Block 2020 provides for grouping line segments according to Modified Propagate Last Labeling combined with other application requirements such as Precision Feature Labeling.

Block 2030 provides for representing features as the extents of groups of line segments. Thus, the method is compatible with the raw data format and the CCL labeling methods disclosed herein and so is the most efficient for hardware and software implementations. Further, a compact representation of a feature is provided. For example, a color subregion can be described as (red(xmin, ymin, xmax, ymax)).

Advantageously, the encoding is flexible. For example, the encoding is compatible with 1D, 2D, and 3D spatial details as exposed by Propagate Last Labeling. Thus, the encoding produces a simple standard format for communicating feature information to other systems.

Figures 21, 22:
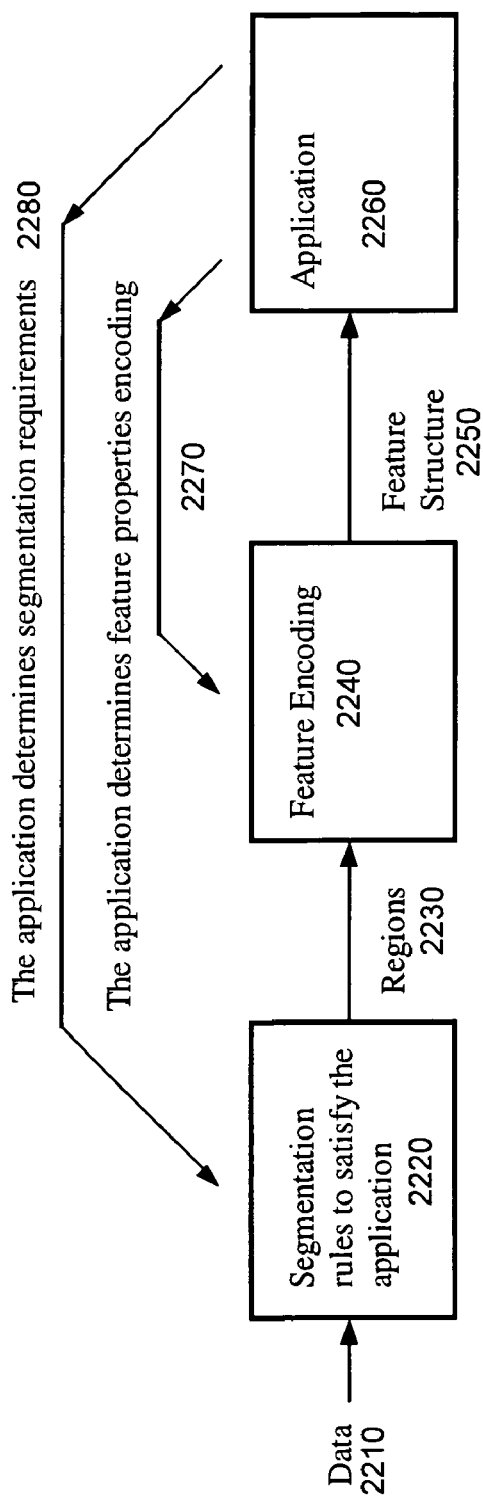
FIG. 21 illustrates exemplary data structures in accordance with an embodiment of the present invention.
FIG. 22 is a schematic data flow diagram illustrating a method in accordance with an embodiment of the present invention.

Referring now to FIG. 21, a digitized version of the encoded feature is illustrated. The bracketed (<...>) material such as label 2110, property 2120, and boundary 2130 represent numerical values illustrate an encoding. For example the color "red" could be represented by the number "2." In one embodiment, region properties vary according to the needs of the application. For example, a banana-sorting machine needs to determine yellow and green regions, while a golf-ball counting machine needs to determine circular regions.

Referring now to FIG. 22 a diagram illustrates how data region properties and encoding are determined by the application requirements. An application can set up the segmentation rules and the appropriate property encoding so that the feature encoding function can extract and package the region features. More specifically, data 2210 is received by block 2220 that applies segmentation rules to satisfy an application. Next, regions 2230 are output to feature encoding block 2240. Feature structure 2250 is output to application 2260. Application 2260 interacts with both feature encoding block to determine feature properties encoding 2270. Also, application 2260 determines segmentation requirements 2280.

Figure 23:
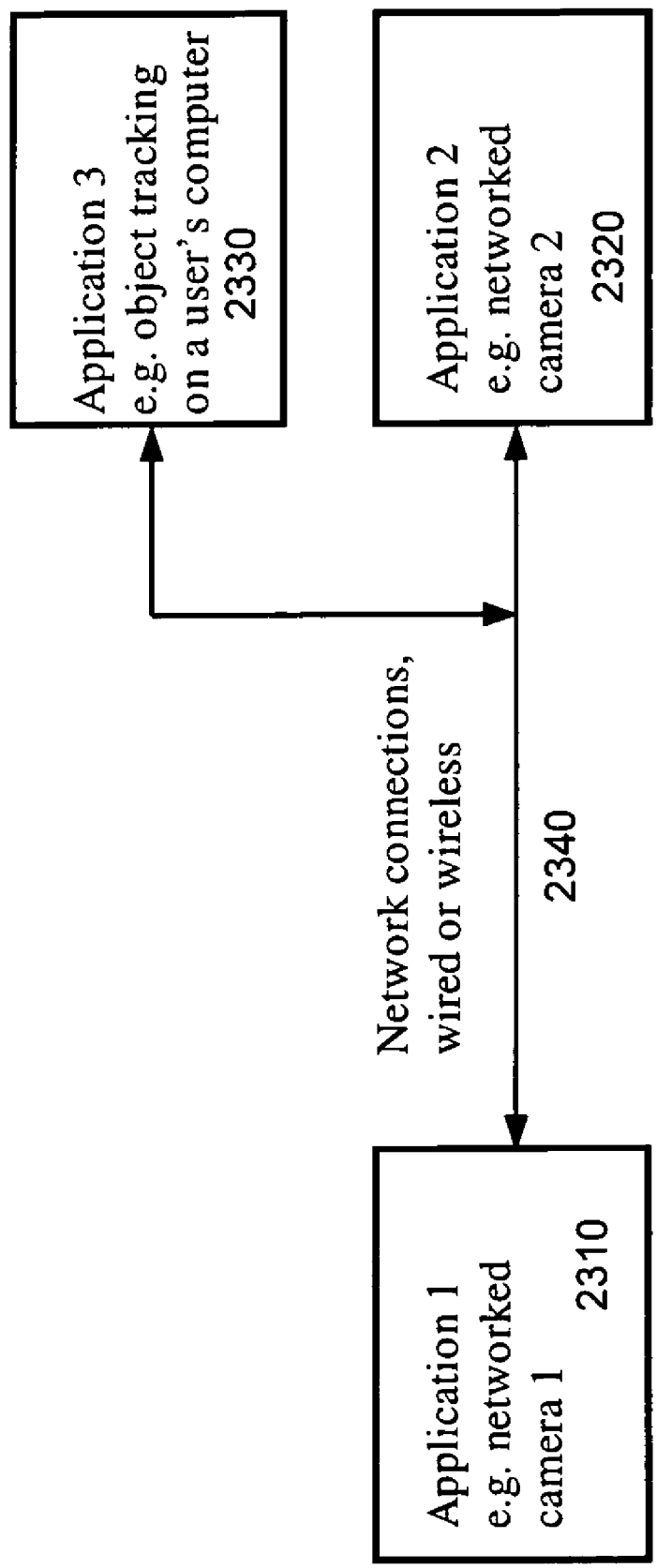
FIG. 23 is a schematic data flow diagram illustrating a networked application method in accordance with an embodiment of the present invention.

Referring now to FIG. 23, a network example is illustrated. Compatible applications have compatible property encoding. As shown, Application 1 2310 can be networked to application 2 2320 and application 3 2330 via a wired or wireless connection 2340. For example, Application 3 can request that App. 2 and App. 3 perform color segmentation and encode "red" as "2." Thereafter all 3 applications can communicate features. Also some standard property encodings may be previously known by applications on the network.

Precison Features

Figure 24:
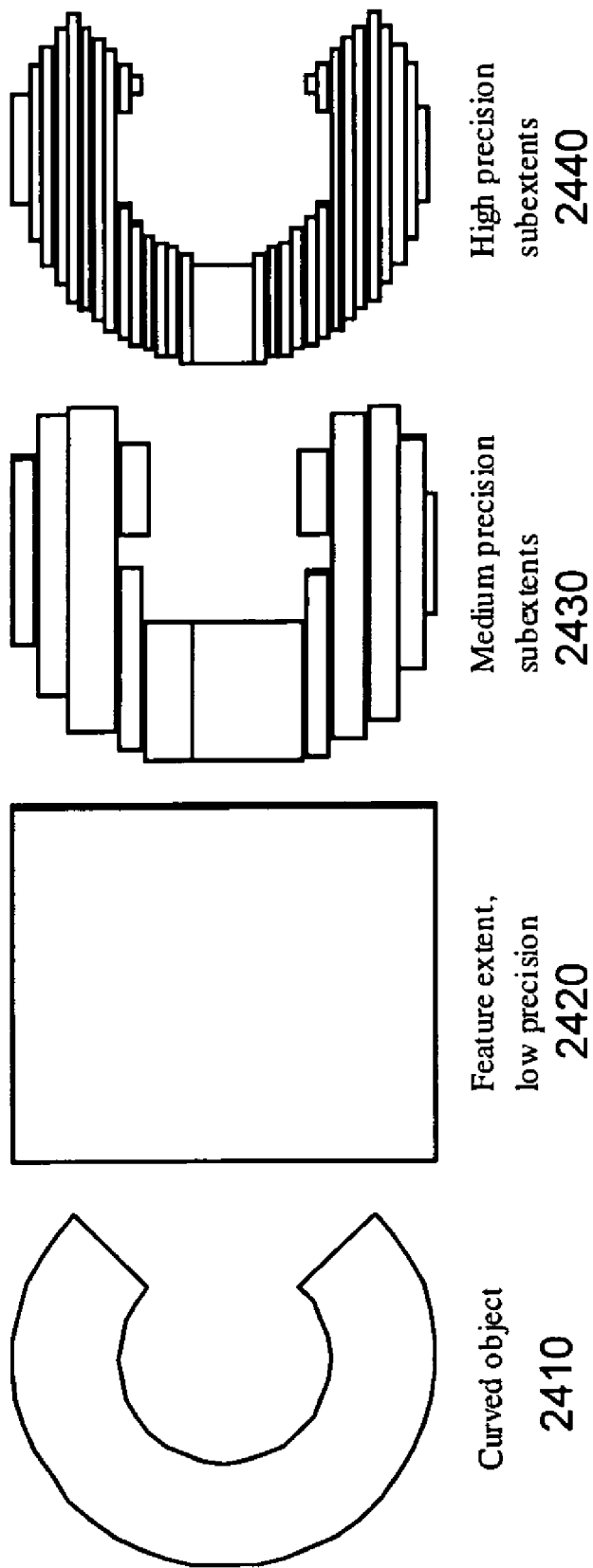
FIG. 24 is a sample precision based connected component example of a method in accordance with an embodiment of the present invention.

Region features are captured as the segments arrive from either the segmentation process or from an appropriate data source. The region maximum and minimum boundaries comprise the extents of the region, represented by a box showing the max-min boundaries, as shown in FIG. 24. Region features are comprised of groups of segments, defined by sub-extents. FIG. 24 illustrates that curved object 2410 can be interpreted by features with a low precision 2420 resulting in a square, a medium precision 2430 resulting in a coarse object, or a high precision resulting in a segmented version of the curved object 2440. Some features, such as shape, vary within the subextent. The larger the group of segments within a subextent, the more inaccurate the feature representation as shown in 2440. But the smaller the extent, the more data that must be recorded and transmitted to the receiving process. Therefore, the precision required of the features should determine subextent size. Lower precision produces less feature data and a more compact representation of a region. Higher precision allows a more accurate representation of the feature. For example, for text recognition, the shape of letters will be important. For counting letters, only the full extent of each letter is required.

A "feature closed flag" is included in the feature structure. When the feature is output to the receiving process, the flag signifies whether this is the last subextent for the feature. If the feature is closed, the next time a feature with the same label is output it will be a new and distinct feature. If the feature is not closed, the next feature with the same label will be the next subextent for this feature.

Precision feature encoding consumes no extra memory because each feature subextent is output when the precision threshold is reached. But the "feature closed flag" is not set. The next feature subextent is written to the same feature structure with the same feature label.

Figure 25:
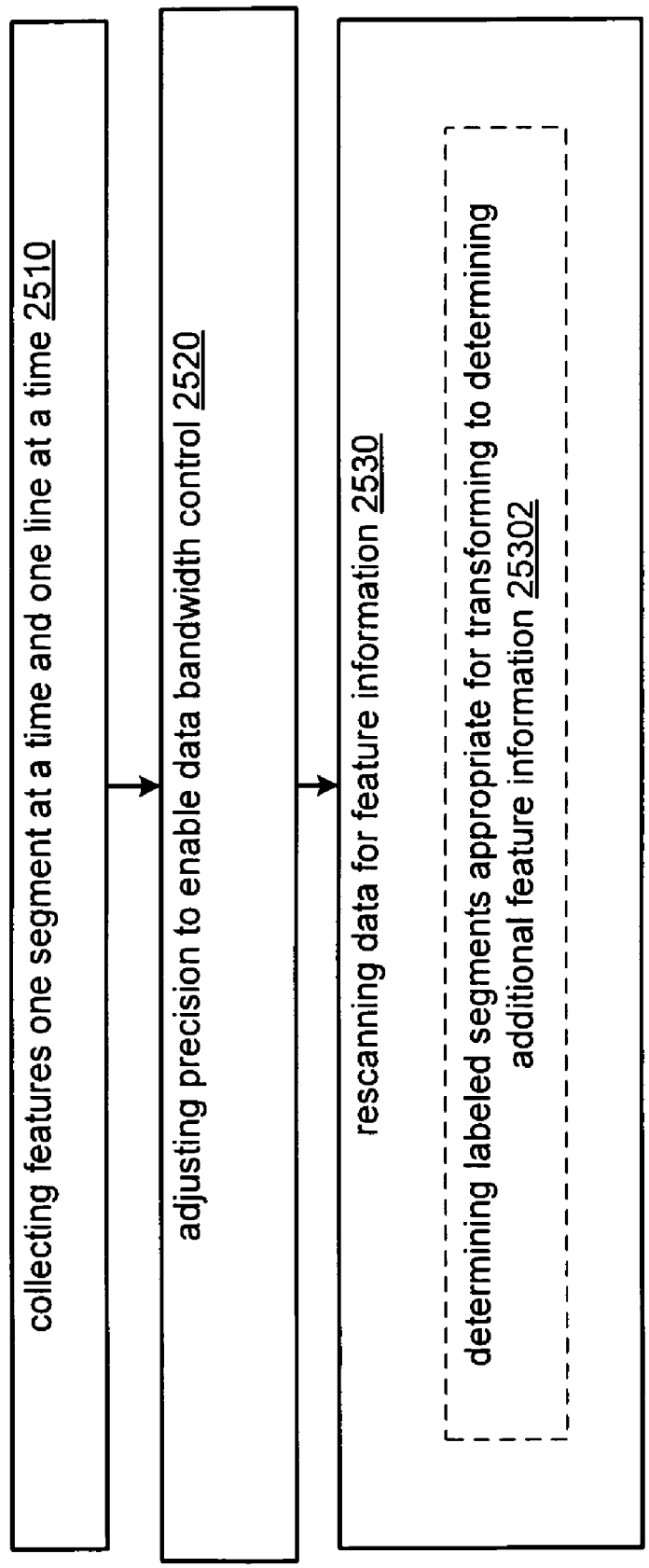
FIG. 25 is a flow diagram illustrating a method in accordance with an embodiment of the present invention.

Referring now to FIG. 25, a method for features is illustrated. Block 2510 provides for collecting features one segment at a time and one line at a time. Block 2520 provides for adjusting precision to enable data bandwidth control. Block 2530 provides for rescanning data for feature information.

Disposed within block 2530 is block 25302 which provides for determining labeled segments appropriate for transforming to determining additional feature information. Specifically, some data qualities may not be captured during segmentation. Although data labels and region information for segments are processed into features, the equivalent raw data locations can be processed and the needed data qualities added to features. For example, desired feature information for an image may include complex texture qualities. The image data locations corresponding to the labeled segments is rescanned and transformed to spatial/frequency coefficients and saved to the appropriate feature.

Note that raw data may be used in the segmentation process, so that some buffering of the raw data could have occurred or be required in accordance with system requirements. Precision features allow the user to adjust the data rate from CCL to suit the application. Motion detection would only need large extents, which produce a low data rate. Object recognition may need smaller extents for more feature information, which would generate a higher data rate. Precision features and a variable data rate make this new CCL technology suitable as the pre-processor for the full range of host processors, from 8-bit embedded microprocessors to 64-bit computers.

All of the functions described above can be linear and efficient in software and parallelizable for hardware for an embedded system.

While the subject matter of the application has been shown and described with reference to particular embodiments thereof, it will be understood by those skilled in the art that the foregoing and other changes in form and detail may be made therein without departing from the spirit and scope of the subject matter of the application, including but not limited to additional, less or modified elements and/or additional, less or modified steps performed in the same or a different order.

Those having skill in the art will recognize that the state of the art has progressed to the point where there is little distinction left between hardware and software implementations of aspects of systems; the use of hardware or software is generally (but not always, in that in certain contexts the choice between hardware and software can become significant) a design choice representing cost vs. efficiency tradeoffs. Those having skill in the art will appreciate that there are various vehicles by which processes and/or systems and/or other technologies described herein can be effected (e.g., hardware, software, and/or firmware), and that the preferred vehicle will vary with the context in which the processes and/or systems and/or other technologies are deployed. For example, if an implementer determines that speed and accuracy are paramount, the implementer may opt for a mainly hardware and/or firmware vehicle; alternatively, if flexibility is paramount, the implementer may opt for a mainly software implementation; or, yet again alternatively, the implementer may opt for some combination of hardware, software, and/or firmware. Hence, there are several possible vehicles by which the processes and/or devices and/or other technologies described herein may be effected, none of which is inherently superior to the other in that any vehicle to be utilized is a choice dependent upon the context in which the vehicle will be deployed and the specific concerns (e.g., speed, flexibility, or predictability) of the implementer, any of which may vary. Those skilled in the art will recognize that optical aspects of implementations will typically employ optically-oriented hardware, software, and or firmware.

The foregoing detailed description has set forth various embodiments of the devices and/or processes via the use of block diagrams, flowcharts, and/or examples. Insofar as such block diagrams, flowcharts, and/or examples contain one or more functions and/or operations, it will be understood by those within the art that each function and/or operation within such block diagrams, flowcharts, or examples can be implemented, individually and/or collectively, by a wide range of hardware, software, firmware, or virtually any combination thereof. In one embodiment, several portions of the subject matter described herein may be implemented via Application Specific Integrated Circuits (ASICs), Field Programmable Gate Arrays (FPGAs), digital signal processors (DSPs), or other integrated formats. However, those skilled in the art will recognize that some aspects of the embodiments disclosed herein, in whole or in part, can be equivalently implemented in standard integrated circuits, as one or more computer programs running on one or more computers (e.g., as one or more programs running on one or more computer systems), as one or more programs running on one or more processors (e.g., as one or more programs running on one or more microprocessors), as firmware, or as virtually any combination thereof, and that designing the circuitry and/or writing the code for the software and or firmware would be well within the skill of one of skill in the art in light of this disclosure. In addition, those skilled in the art will appreciate that the mechanisms of the subject matter described herein are capable of being distributed as a program product in a variety of forms, and that an illustrative embodiment of the subject matter described herein applies equally regardless of the particular type of signal bearing media used to actually carry out the distribution. Examples of a signal bearing media include, but are not limited to, the following: recordable type media such as floppy disks, hard disk drives, CD ROMs, digital tape, and computer memory; and transmission type media such as digital and analog communication links using TDM or IP based communication links (e.g., packet links).

The herein described aspects depict different components contained within, or connected with, different other components. It is to be understood that such depicted architectures are merely exemplary, and that in fact many other architectures can be implemented which achieve the same functionality. In a conceptual sense, any arrangement of components to achieve the same functionality is effectively "associated" such that the desired functionality is achieved. Hence, any two components herein combined to achieve a particular functionality can be seen as "associated with" each other such that the desired functionality is achieved, irrespective of architectures or intermedial components. Likewise, any two components so associated can also be viewed as being "operably connected", or "operably coupled", to each other to achieve the desired functionality, and any two components capable of being so associated can also be viewed as being "operably couplable", to each other to achieve the desired functionality. Specific examples of operably couplable include but are not limited to physically mateable and/or physically interacting components and/or wirelessly interactable and/or wirelessly interacting components and/or logically interacting and/or logically interactable components.

While particular aspects of the present subject matter described herein have been shown and described, it will be apparent to those skilled in the art that, based upon the teachings herein, changes and modifications may be made without departing from the subject matter described herein and its broader aspects and, therefore, the appended claims are to encompass within their scope all such changes and modifications as are within the true spirit and scope of this subject matter described herein. Furthermore, it is to be understood that the invention is defined by the appended claims. It will be understood by those within the art that, in general, terms used herein, and especially in the appended claims (e.g., bodies of the appended claims) are generally intended as "open" terms (e.g., the term "including" should be interpreted as "including but not limited to," the term "having" should be interpreted as "having at least," the term "includes" should be interpreted as "includes but is not limited to," etc.). It will be further understood by those within the art that if a specific number of an introduced claim recitation is intended, such an intent will be explicitly recited in the claim, and in the absence of such recitation no such intent is present. For example, as an aid to understanding, the following appended claims may contain usage of the introductory phrases "at least one" and "one or more" to introduce claim recitations. However, the use of such phrases should not be construed to imply that the introduction of a claim recitation by the indefinite articles "a" or "an" limits any particular claim containing such introduced claim recitation to inventions containing only one such recitation, even when the same claim includes the introductory phrases "one or more" or "at least one" and indefinite articles such as "a" or "an" (e.g., "a" and/or "an" should typically be interpreted to mean "at least one" or "one or more"); the same holds true for the use of definite articles used to introduce claim recitations. In addition, even if a specific number of an introduced claim recitation is explicitly recited, those skilled in the art will recognize that such recitation should typically be interpreted to mean at least the recited number (e.g., the bare recitation of "two recitations," without other modifiers, typically means at least two recitations, or two or more recitations). Furthermore, in those instances where a convention analogous to "at least one of A, B, and C, etc." is used, in general such a construction is intended in the sense one having skill in the art would understand the convention (e.g., "a system having at least one of A, B, and C" would include but not be limited to systems that have A alone, B alone, C alone, A and B together, A and C together, B and C together, and/or A, B, and C together, etc.). In those instances where a convention analogous to "at least one of A, B, or C, etc." is used, in general such a construction is intended in the sense one having skill in the art would understand the convention (e.g., "a system having at least one of A, B, or C" would include but not be limited to systems that have A alone, B alone, C alone, A and B together, A and C together, B and C together, and/or A, B, and C together, etc.).

I claim:

1. A connected components labeling system comprising:
a processor;
a memory coupled to the processor, the memory configured to include:
a label buffer configured to be initialized with a sequential count at the beginning of an operation for each array of input data in a raster order, the label buffer configured to hold current labels in use during an operation, the label buffer independent from the height of a connected region;
a label queue coupled to the label buffer, the label queue configured to contain a plurality of locations for holding one or more region labels for the connected components labeling system, the label queue configured to store one or more inactive, closed and/or not currently in use labels and to dispense one or more new labels to the label buffer and receive one or more closed labels no longer required, the one or more inactive labels; and
a label list coupled to the label buffer and the label queue, the label list configured to receive one or more closed labels no longer required by the label buffer.

* * * * *